United States Patent
Fujii

(10) Patent No.: US 11,745,796 B2
(45) Date of Patent: *Sep. 5, 2023

(54) LANE CHANGE ASSIST APPARATUS FOR VEHICLE

(71) Applicant: TOYOTA JIDOSHA KABUSHIKI KAISHA, Toyota (JP)

(72) Inventor: Shota Fujii, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

This patent is subject to a terminal disclaimer.

(21) Appl. No.: 17/514,093

(22) Filed: Oct. 29, 2021

(65) Prior Publication Data

US 2022/0048567 A1 Feb. 17, 2022

Related U.S. Application Data

(63) Continuation of application No. 17/462,847, filed on Aug. 31, 2021, which is a continuation of application (Continued)

(30) Foreign Application Priority Data

Apr. 12, 2017 (JP) .................................. 2017-078662
May 26, 2017 (JP) .................................. 2017-104431

(51) Int. Cl.
  *B62D 15/02* (2006.01)
  *G05D 1/02* (2020.01)
  *B62D 6/00* (2006.01)
(52) U.S. Cl.
  CPC ......... *B62D 15/0255* (2013.01); *B62D 6/003* (2013.01); *G05D 1/0212* (2013.01);
  (Continued)

(58) Field of Classification Search
  CPC .. B62D 15/0255; B62D 6/003; G05D 1/0212; G05D 1/0246; G05D 1/0257;
  (Continued)

(56) References Cited

U.S. PATENT DOCUMENTS

| 5,913,375 A | 6/1999 | Nishikawa |
| 7,893,819 B2 | 2/2011 | Pfeiffer et al. |

(Continued)

FOREIGN PATENT DOCUMENTS

| JP | 2008-149855 A | 7/2008 |
| JP | 2016-141264 A | 8/2016 |

OTHER PUBLICATIONS

Non-Final Office Action dated Jun. 30, 2022 in U.S. Appl. No. 16/890,455.

(Continued)

*Primary Examiner* — Dale W Hilgendorf
(74) *Attorney, Agent, or Firm* — Sughrue Mion, PLLC

(57) ABSTRACT

A driving support Electronic Control Unit (ECU) initializes a target trajectory calculation parameter at a start of Lane Change Assist Control (LCA), calculates, based on the target trajectory calculation parameter, a target trajectory function representing a target lateral position in accordance with an elapsed time from the start of LCA; and calculates a target control amount according to the target trajectory function. When it is determined that the own vehicle has crossed a boundary white line, the driving support ECU again initializes the target trajectory calculation parameter, and calculate the target trajectory function based on the target trajectory calculation parameter.

3 Claims, 10 Drawing Sheets

Related U.S. Application Data

No. 15/950,402, filed on Apr. 11, 2018, now Pat. No. 11,142,246.

(52) U.S. Cl.
CPC ......... G05D 1/0246 (2013.01); G05D 1/0257 (2013.01); *B60Y 2200/11* (2013.01); *B60Y 2400/3015* (2013.01); *B60Y 2400/3017* (2013.01); *B60Y 2400/83* (2013.01); *B60Y 2400/90* (2013.01); *B60Y 2400/92* (2013.01); *G05D 2201/0213* (2013.01)

(58) Field of Classification Search
CPC ........ G05D 2201/0213; B60Y 2200/11; B60Y 2400/83; B60Y 2400/3015; B60Y 2400/3017; B60Y 2400/90; B60Y 2400/92

See application file for complete search history.

(56) References Cited

U.S. PATENT DOCUMENTS

| | | | |
|---|---|---|---|
| 8,301,343 B2 | 10/2012 | Tanimoto | |
| 9,229,453 B1 * | 1/2016 | Lee | B60W 10/20 |
| 9,499,197 B2 | 11/2016 | Tan et al. | |
| 9,779,628 B2 | 10/2017 | Yamashiro | |
| 9,884,645 B2 * | 2/2018 | Fujii | B60W 10/20 |
| 10,114,371 B2 | 10/2018 | Asakura et al. | |
| 10,600,324 B2 | 3/2020 | Fujii | |
| 10,668,920 B2 | 6/2020 | Fujii | |
| 10,676,084 B2 | 6/2020 | Fujii | |
| 10,676,093 B2 | 6/2020 | Nishiguchi | |
| 10,703,362 B2 | 7/2020 | Maura | |
| 10,814,913 B2 * | 10/2020 | Fujii | G05D 1/0246 |
| 10,953,882 B2 | 3/2021 | Fujii | |
| 11,142,246 B2 * | 10/2021 | Fujii | B62D 15/0255 |
| 11,358,594 B2 | 6/2022 | Fujii | |
| 11,427,194 B2 | 8/2022 | Fujii | |
| 2004/0158377 A1 | 8/2004 | Matsumoto et al. | |
| 2010/0049375 A1 | 2/2010 | Tanimoto | |
| 2010/0082195 A1 | 4/2010 | Lee et al. | |
| 2012/0191343 A1 | 7/2012 | Haleem | |
| 2015/0142207 A1 | 5/2015 | Flehmig et al. | |
| 2016/0107687 A1 | 4/2016 | Yamaoka | |
| 2016/0185388 A1 * | 6/2016 | Sim | B60W 10/04 701/41 |
| 2016/0225261 A1 | 8/2016 | Matsumoto | |
| 2016/0304126 A1 * | 10/2016 | Yamaoka | B60K 35/00 |
| 2016/0311464 A1 * | 10/2016 | Yamaoka | B62D 15/0255 |
| 2018/0118215 A1 | 5/2018 | Kim | |
| 2018/0297638 A1 * | 10/2018 | Fujii | B60W 30/12 |
| 2018/0297640 A1 | 10/2018 | Fujii | |
| 2018/0345959 A1 | 12/2018 | Fujii | |
| 2018/0345960 A1 | 12/2018 | Fujii | |
| 2018/0345964 A1 | 12/2018 | Fujii et al. | |
| 2018/0346027 A1 | 12/2018 | Fujii | |
| 2019/0009818 A1 * | 1/2019 | Ide | B62D 15/024 |
| 2019/0047469 A1 * | 2/2019 | Nishiguchi | B62D 15/0255 |
| 2019/0061819 A1 | 2/2019 | Park | |
| 2019/0096258 A1 | 3/2019 | Ide et al. | |
| 2020/0290677 A1 | 9/2020 | Fujii | |
| 2022/0119039 A1 | 4/2022 | Fujii | |

OTHER PUBLICATIONS

Office Action dated Oct. 10, 2019 in U.S. Appl. No. 15/950,404.
Notice of Allowance dated Jul. 1, 2020 from the United States Patent and Trademark Office in U.S. Appl. No. 15/950,404.
Notice of Allowance dated Jan. 26, 2023 in U.S. Appl. No. 16/890,455.
Office Action dated May 9, 2023 in U.S. Appl. No. 17/563,849.
Notice of Allowance dated Apr. 3, 2023 in U.S. Appl. No. 16/890,455.

* cited by examiner though a case may occur in which the lane width of the target lane is different from that of the original lane. If the target trajectory calculated at the start of the lane change assist (that is, the target trajectory calculated by using the estimated lane width of the target lane) is used until the completion of the lane change assist as it is, there is a possibility that the own vehicle cannot be moved to an appropriate position of the target lane (which is typically the center position in a lane width direction of the target lane).

LANE CHANGE ASSIST APPARATUS FOR VEHICLE

CROSS-REFERENCE TO RELATED APPLICATION

The present application is a continuation of U.S. application Ser. No. 17/462,847, filed on Aug. 31, 2021, which is a continuation of U.S. application Ser. No. 15/950,402, filed on Apr. 11, 2018, which is now U.S. Pat. No. 11,142,246 issued on Oct. 12, 2021, which claims priority to Japanese patent application No.'s JP 2017-078662, filed on Apr. 12, 2017 and JP 2017-104431, filed on May 26, 2017. The entire disclosures of the prior applications are considered part of the disclosure of the accompanying continuation application, and are hereby incorporated by reference.

BACKGROUND OF THE INVENTION

1. Field of the Invention

The present invention relates to a lane change assist apparatus for a vehicle configured to assist/support a steering operation for changing lanes.

2. Description of the Related Art

Conventionally, a lane change assist apparatus has been known which is configured to assist a steering operation (steering wheel operation) for changing lanes. Such a lane change assist apparatus calculates a target trajectory in such a manner that a vehicle changes a traveling direction of the own vehicle toward a lane (adjacent lane) being a destination of changing lanes. The lane change assist apparatus controls a steering angle of right and left steered wheels in such a manner that the vehicle travels along the calculated target trajectory.

For example, proposed conventional self vehicle 1 in Japanese Patent Application Laid-Open 2008-149855, hereinafter "Tomoyuki" successively/sequentially calculates a target traveling position of the own vehicle based on position information on a plurality of points along a center line of an adjacent lane and information of the current position of the own vehicle. The conventional self vehicle 1 calculates/determines a target trajectory based on information on the calculated target traveling position.

The self vehicle 1 of Tomoyuki recognizes lanes based on road map information. As another example, another known conventional apparatus recognizes lanes based on an image ahead of the own vehicle acquired by a camera sensor. In the other known conventional apparatus, the camera sensor detects lane markers (compartment lines) of the lanes (hereinafter referred to as a "white line(s)"). Based on the information on the detected white lines, the camera sensor recognizes a lane (hereinafter referred to as an "original lane") in which the own vehicle is traveling at a start of the lane change assist, and a lane (hereinafter referred to as a "target lane") which is a destination lane for lane change, and which is adjacent to the original lane. The other known conventional apparatus calculates a target trajectory for moving the own vehicle to the target lane based the recognized original lane and target lane.

When recognizing the lanes by using the camera sensor, recognition accuracy of the target lane is sometimes lower than that of the original lane. When the recognition accuracy of the target lane is low, a lane width of the target lane may be estimated/presumed based on a lane width of the original lane (e.g., in such a manner that the lane width of the target lane is presumed to be equal to the lane width of the original lane), to thereby calculate the target trajectory. However, a case may occur in which the lane width of the target lane is different from that of the original lane. If the target trajectory calculated at the start of the lane change assist (that is, the target trajectory calculated by using the estimated lane width of the target lane) is used until the completion of the lane change assist as it is, there is a possibility that the own vehicle cannot be moved to an appropriate position of the target lane (which is typically the center position in a lane width direction of the target lane).

The present invention is made to cope with the problem described above. That is, one of objects of the present invention is to have the own vehicle change lanes toward the target lane appropriately.

In order to achieve the above-mentioned object, according to one embodiment of the present invention, there is provided a lane change assist apparatus for a vehicle, including:
- a camera (12a) for taking an image ahead of an own vehicle;
- a lane recognition unit (12b) for recognizing a lane based on the image taken by the camera to detect a relative positional relationship of the own vehicle with respect to the lane;
- a target trajectory calculation unit for, based on the relative positional relationship of the own vehicle with respect to the lane, calculating a target trajectory in such a manner that the own vehicle changes lanes toward a target lane; and
- an assist control unit for executing/performing lane change assist control by controlling steering of a steered wheel in such a manner that the own vehicle travels along the target trajectory.

The lane change assist apparatus further includes a boundary-crossing determination unit (S19) for determining whether or not the own vehicle has crossed a boundary between an original lane on which the own vehicle travels at a start of the lane change assist control, and the target lane adjacent to the original lane in a lane change direction.

The target trajectory calculation unit includes:
- a first calculation unit (S13, S14) for, at the start of the lane change assist control, calculating the target trajectory along which the own vehicle is to travel from the start of the lane change assist control until a completion of the lane change assist control; and
- a second calculation unit (S22, S23) for, at a boundary-crossing time point at which the boundary-crossing determination unit determines that the own vehicle has crossed the boundary, calculating the target trajectory along which the own vehicle is to travel from the boundary-crossing time point until the completion of the lane change assist control.

The assist control unit is configured to
- control the steering of the steered wheel in such a manner that the own vehicle travels along the target trajectory calculated by the first calculation unit until the boundary-crossing time point, and
- control the steering of the steered wheel in such a manner that the own vehicle travels along the target trajectory calculated by the second calculation unit after the boundary-crossing time point (S15 to S18).

In the lane change assist apparatus, the lane recognition unit recognizes the lane based on the image ahead of the own vehicle taken by the camera, and detects the relative positional relationship of the own vehicle with respect to the lane. The lane is, for example, an area sectioned by white lines. The target trajectory along which the own vehicle is to travel can be defined/determined through recognizing the lane. The target trajectory calculation unit calculates the target trajectory along which the own vehicle is to travel to change lanes toward the target lane (which is adjacent to the original lane), based on the relative positional relationship of the own vehicle with respect to the lane. The assist control unit executes/performs the lane change assist control to control the steering of the steered wheel in such a manner that the own vehicle travels along the target trajectory.

As described above, if the target trajectory calculated at the start of the lane change assist continues being used until the completion of the lane change assist as it is, there is a possibility that the own vehicle cannot be moved to an appropriate position of the target lane. Therefore, the lane change assist apparatus includes the boundary-crossing determination unit. The boundary-crossing determination unit determines whether or not the own vehicle has crossed (passed across) the boundary between the "original lane in which the own vehicle travels at the start of the lane change assist control" and the "target lane adjacent to the original lane in the lane change direction".

The target trajectory calculation unit includes the first calculation unit and the second calculation unit. The first calculation unit calculates, at the start of the lane change assist control, the target trajectory along which the own vehicle is to travel from the start of the lane change assist control (until the completion of the lane change assist control). Further, the second calculation unit calculates, at the boundary-crossing time point at which the boundary-crossing determination unit determines that the own vehicle has crossed the boundary, the target trajectory along which the own vehicle is to travel from the boundary-crossing time point (until the completion of the lane change assist control).

The assist control unit controls the steering of the steered wheel in such a manner that the own vehicle travels along the target trajectory calculated by the first calculation unit until the boundary-crossing time point. Further, the assist control unit controls the steering of the steered wheel in such a manner that the own vehicle travels along the target trajectory calculated by the second calculation unit after the boundary-crossing time point.

Therefore, on the way to the target lane according to the lane change assist control (more specifically, at the boundary-crossing time point at which the own vehicle has crossed the boundary), the target trajectory is recalculated. At that time, the lane recognition unit can detect a final target position in the target lane with higher accuracy compared to at the start of the lane change assist control, because the vehicle has reached the target lane. Therefore, the second calculation unit can calculate the target trajectory more appropriately. The steering of the steered wheel is controlled based on the appropriately-calculated target trajectory. Accordingly, the own vehicle can be made to change lanes in an appropriate/suitable manner.

In an aspect of the present invention, the first calculation unit is configured to:
 set a target lane change time period which is a target time period from the start of the lane change assist control until the completion of the lane change assist control; and
 calculate, as the target trajectory, a target trajectory function representing a target lateral position which is a target position of the own vehicle in the lane width direction in accordance with a first elapse time from the start of the lane change assist control based on the target lane change time period.

Further, the second calculation unit is configured to calculate, as the target trajectory, a target trajectory function representing a target lateral position which is a target position of the own vehicle in the lane width direction in accordance with a second elapse time from the boundary-crossing time point based on the target lane change time period.

In the above aspect of the present invention, the first calculation unit sets the target lane change time period which is the target time period from the start of the lane change assist control until the completion of the lane change assist control. It is preferable that the target lane change time period be longer as the "distance in the lane width (road width) direction by which the own vehicle travels from the position at the start of the lane change assist control to the final target position" is longer. The first calculation unit calculates the target trajectory function as the target trajectory based on the target lane change time period. In the first calculation unit, the target trajectory function represents/expresses the target lateral position which is the target position of the own vehicle in the lane width direction in accordance with the first elapse time from the start of the lane change assist control.

Further, the second calculation unit calculates the target trajectory function as the target trajectory based on the target lane change time period. In the second calculation unit, the target trajectory function represents/expresses the target lateral position which is the target position of the own vehicle in the lane width direction in accordance with the second elapse time from the boundary-crossing time point. In this manner, the target trajectory function can be recalculated based on the relative position of the own vehicle with respect to the lane which has been detected by the lane recognition unit at the boundary-crossing time point (at which it is determined that the own vehicle has crossed the boundary). Therefore, the target trajectory function can be obtained with high accuracy.

The assist control unit controls the steering of the steered wheel in such a manner that a lateral position which is a position of the own vehicle in the lane width direction matches (becomes equal to) the target lateral position. Therefore, the lateral position of the own vehicle can be controlled in accordance with an elapsed time. Accordingly, the own vehicle can be made to change lanes along a desired trajectory.

In an aspect of the present invention, when a remaining time period which is a difference between the target lane change time period and a time period from the start of the start of the lane change assist control to the boundary-crossing time point is shorter than a predetermined lower limit value, the second calculation unit is configured to modify the target lane change time period to increase the target lane change time period.

During the lane change assist control, a case may occur in which a time period until the boundary-crossing time point (at which it is determined that the own vehicle has crossed the boundary) is longer than an assumed time period due to some sort of disturbance. In such a case, the remaining time period which is the difference between the target lane change time period and the time period from the start of the start of the lane change assist control to the boundary-crossing time point becomes shorter. Therefore, there is a possibility that the lane change assist apparatus cannot appropriately execute the lane change assist control toward the final target position. In view of this, when the remaining time period is shorter than the predetermined lower limit value, the second calculation unit modifies the target lane change time period so as to increase the target lane change time period. Consequently, the target trajectory function can be recalculated in a suitable manner, and therefore, the own vehicle can be made to change lanes appropriately.

In an aspect of the present invention, the assist control unit includes:
- a target lateral state amount calculation unit (S15) for, based on the target trajectory function calculated by the first calculation unit or the second calculation unit, successively calculating a target lateral state amount which represents a target lateral position (y*) of the own vehicle at a current time point and a target lateral movement state amount (vy*, ay*), the target lateral movement state amount being a target value of a movement state of the own vehicle in the lane width direction at the current time point;
- a target yaw state amount calculation unit (S16) for successively acquiring a vehicle speed of the own vehicle at the current time point, and successively calculating a target yaw state amount (Cu*, θy*, γ*) which is a target value at the current time point related to a movement for changing a direction of the own vehicle, based on the vehicle speed and the target lateral movement state amount; and
- a steering control unit (S17, S18) for controlling the steering of the steered wheel based on the target lateral position and the target yaw state amount.

In the above aspect of the present invention, the assist control unit includes the target lateral state amount calculation unit, the target yaw state amount calculation unit, and the steering control unit. The target lateral state amount calculation unit successively/sequentially calculates the target lateral state amount based on the target trajectory function calculated by the first calculation unit or the second calculation unit. The target lateral state amount represents/expresses the target lateral position of the own vehicle at the current time point, and the target lateral movement state amount which is the target value of the movement state of the own vehicle in the lane width direction at the current time point.

The lateral movement state amount includes, for example, a speed in the lane width direction of the own vehicle and/or acceleration in the lane width direction of the own vehicle. For example, with differentiating the target trajectory function with respect to time, a target lateral speed (speed in the lane width direction) of the own vehicle at that time point can be acquired. Further, with second-order differentiating the target trajectory function with respect to time, a target lateral acceleration (acceleration in the lane width direction) of the own vehicle at that time point can be acquired. Therefore, the target lateral movement state amount can be calculated with the target trajectory function.

As the vehicle speed of the own vehicle is acquired, the target yaw state amount can be calculated, which is the target value related to the movement (movement for changing the direction of the own vehicle) required to obtain the target lateral movement state amount of the own vehicle. Therefore, the target yaw state amount calculation unit successively/sequentially calculates the target yaw state amount which is the target value at the current time point related to the movement for changing the direction of the own vehicle, based on the vehicle speed and the target lateral movement state amount.

The steering control unit controls the steering of the steered wheel based on the target lateral position and the target yaw state amount. That is, the steering control unit controls the steering of the steered wheel in such a manner that the lateral position of the own vehicle matches (becomes equal to) the target lateral position and the yaw state amount for changing the direction of the own vehicle matches (becomes equal to) the target yaw state amount.

According to the above aspect of the present invention, the own vehicle can be made to change lanes smoothly while reflecting an accelerator pedal operation by the driver (that is, change in the vehicle speed).

In an aspect of the present invention, the first calculation unit is configured to calculate the target trajectory function representing the target lateral position which is the target position of the own vehicle in the lane width direction in accordance with the first elapse time from the start of the lane change assist control, based on:
- (i) an initial lateral state amount representing a lateral position of the own vehicle with respect to the original lane at the start of the lane change assist control and a lateral movement state amount which is a movement state of the own vehicle in the lane width direction at the start of the lane change assist control;
- (ii) a final target lateral state amount representing a target lateral position of the own vehicle with respect to the original lane at the completion of the lane change assist control and a target lateral movement state amount of the own vehicle at the completion of the lane change assist; and
- (iii) the target lane change time period.

The second calculation unit is configured to calculate a set lateral state amount at the boundary-crossing time point representing a set lateral position of the own vehicle with respect to the target lane at the boundary-crossing time point and a set lateral movement state amount at the boundary-crossing time point, based on:
- (i) at least one of a lateral position of the own vehicle with respect to the target lane at the boundary-crossing time point and a target lateral position with respect to the target lane at the boundary-crossing time point; and
- (ii) at least one of a lateral movement state amount of the own vehicle at the boundary-crossing time point and a target lateral movement state amount at the boundary-crossing time point.

The second calculation unit is configured to calculate, the target trajectory function representing the target lateral position which is a target position of the own vehicle in the lane width direction in accordance with the second elapse time from the boundary-crossing time point, based on:
- (i) the set lateral state amount at the boundary-crossing time point;
- (ii) a final target lateral state amount representing a target lateral position of the own vehicle with respect to the target lane at the completion of the lane change assist control and the target lateral movement state amount at the completion of the lane change assist control; and
- (iii) the target lane change time period.

In the above aspect of the present invention, the first calculation unit calculates the target trajectory function representing/expressing the target lateral position which is the target position of the own vehicle in the lane width direction in accordance with the first elapse time from the start of the lane change assist control, based on the initial lateral state amount, the final target lateral state amount, and the target lane change time period.

The initial lateral state amount represents the lateral position of the own vehicle with respect to the original lane at the start of the lane change assist control, and the lateral movement state amount which is the movement state of the own vehicle in the lane width direction at the start of the lane change assist control. Further, the final target lateral state amount represents the target lateral position with respect to the original lane at the completion of the lane change assist control, and the target lateral movement state amount at the completion of the lane change assist. In addition, the target lane change time period represents the target time period from the start of the lane change assist control until the completion of the lane change assist control. The lateral movement state amount includes, for example, a detection value(s) of speed and/or acceleration in the lane width direction of the own vehicle. The target lateral movement state amount includes, for example, a target value(s) of speed and/or acceleration in the lane width direction of the own vehicle. The lateral position of the own vehicle and the lateral movement state amount of the own vehicle are acquired from the relative positional relationship of the own vehicle with respect to the lane which has been detected by the lane recognition unit.

Further, the second calculation unit calculates the target trajectory function representing the target lateral position which is the target position of the own vehicle in the lane width direction in accordance with the second elapse time from the boundary-crossing time point, based on the set lateral state amount at the boundary-crossing time point, the final target lateral state amount, and the target lane change time period.

The set lateral state amount at the boundary-crossing time point represents the set lateral position of the own vehicle with respect to the target lane at the boundary-crossing time point and the set lateral movement state amount at the boundary-crossing time point. The set lateral state amount at the boundary-crossing time point is calculated based on:

(i) at least one of the lateral position of the own vehicle with respect to the target lane at the boundary-crossing time point and the target lateral position with respect to the target lane at the boundary-crossing time point; and (ii) at least one of the lateral movement state amount of the own vehicle at the boundary-crossing time point and the target lateral movement state amount at the boundary-crossing time point.

Therefore, at the boundary-crossing time point at which the own vehicle has crossed the boundary, the target trajectory function can be calculated, which smoothly varies the actual lateral state amount of the own vehicle from the lateral state amount of the own vehicle at that time point or the target lateral state amount of the own vehicle at that time point. As a result, the own vehicle can be made to change lanes in a smoother manner.

In an aspect of the present invention, the target yaw state amount calculation unit is configured to calculate, as the target yaw state amount, at least one of (i) a target yaw angle which is a target value of an angle on a horizontal plane between a direction in which the own vehicle is directing and a direction of the lane, (ii) a target yaw rate which is a target value of a yaw rate of the own vehicle, and (iii) a target curvature which is a curvature of the target trajectory.

According to the above aspect, the target yaw state amount can be calculated in a suitable manner to thereby have the own vehicle change lanes appropriately. For example, the target yaw angle can be calculated by assigning a value obtained by dividing the target lateral speed by the vehicle speed to an arc sine function. Further, the target yaw rate can be calculated by dividing the target lateral acceleration by the vehicle speed. Further, the target curvature can be calculated by dividing the target lateral acceleration by a square value of the vehicle speed.

In an aspect of the present invention, the lane recognition unit is configured to output, to the boundary-crossing determination unit, lateral position information on a position of the own vehicle in the lane width direction with respect to a center line of the lane in which the own vehicle is traveling, and the boundary-crossing determination unit is configured to determine that the own vehicle has crossed the boundary, when the lateral position information output from the lane recognition unit is switched from the lateral position information on the original lane to the lateral position information on the target lane.

In the above aspect of the present invention, the lane recognition unit outputs to the boundary-crossing determination unit the lateral position information on the position of the own vehicle in the lane width direction with respect to the center line of the lane in which the own vehicle is traveling. The lateral position information represents the position of the own vehicle in the lane width direction with respect to the center line of the lane, and therefore, includes information on whether the own vehicle is positioned on the right or left side with respect to the center line. For example, when the own vehicle has crossed the boundary, the lateral position information representing that the own vehicle is positioned on the right side of the center line of the "original lane" is switched to the lateral position information representing that the own vehicle is positioned on the left side of the center line of the "target lane". Therefore, by using the above-mentioned switching of the lateral position information, the determination can be made as to whether or not the own vehicle has crossed the boundary.

Therefore, the boundary-crossing determination unit determines that the own vehicle has crossed the boundary, when the lateral position information output from the lane recognition unit is switched from the lateral position information on the original lane to the lateral position information on the target lane. Accordingly, the determination can be made appropriately, as to whether or not the own vehicle has crossed the boundary.

In the above description, references used in the following descriptions regarding embodiments are added with parentheses to the elements of the present invention, in order to assist in understanding the present invention. However, those references should not be used to limit the scope of the invention.

DETAILED DESCRIPTION OF THE EMBODIMENTS

A lane change assist apparatus according to the present invention will next be described with reference to the drawings.

Figure 1:
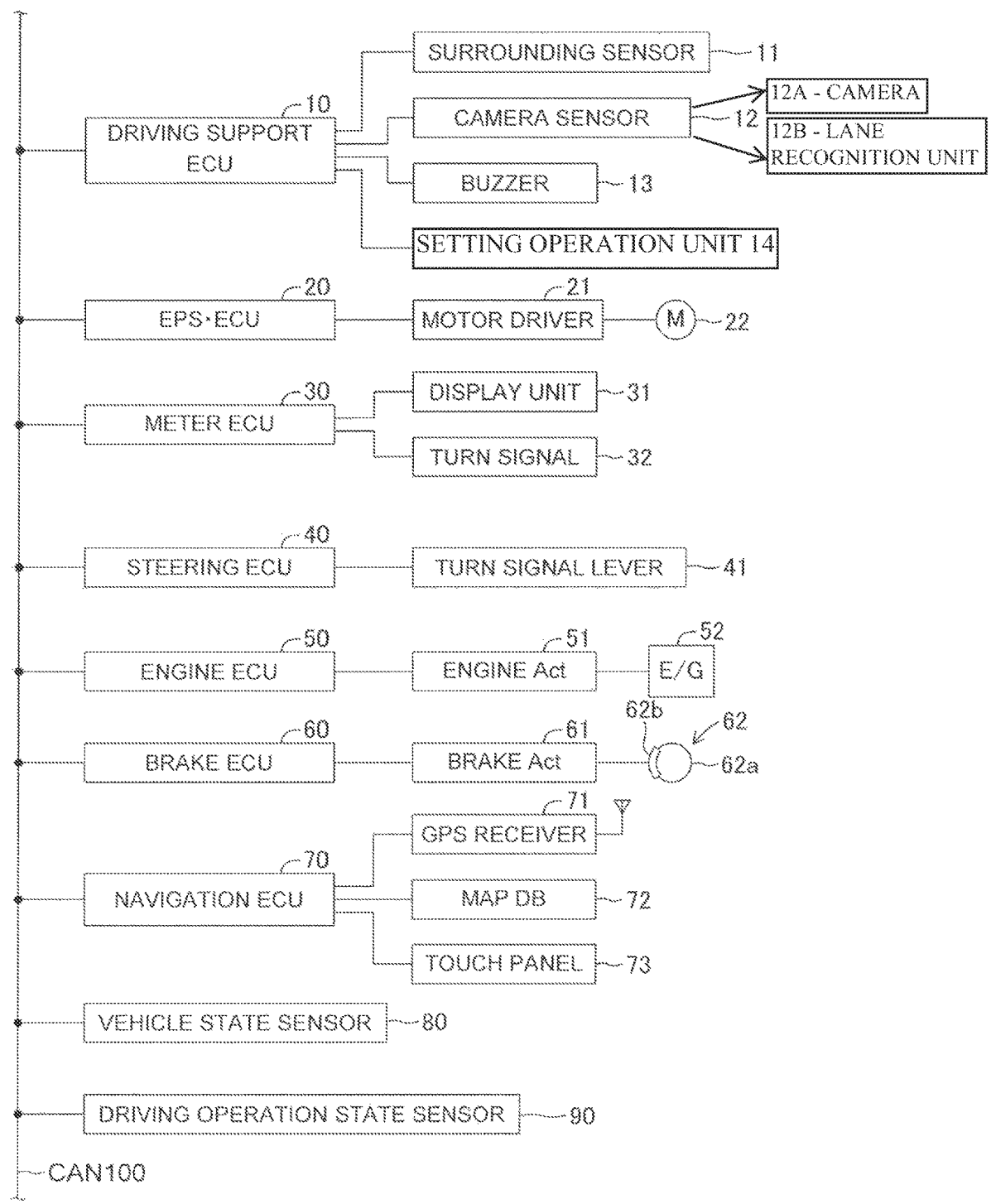
FIG. 1 is a schematic configuration diagram for illustrating a lane change assist apparatus for a vehicle according to an embodiment of the present invention.

The lane change assist apparatus according to the embodiment of the present invention is applied to a vehicle (hereinafter also referred to as an "own vehicle" in order to be distinguished from other vehicles). The lane change assist apparatus, as illustrated in FIG. 1, includes a driving support (assist) ECU 10, an electric power steering ECU 20, a meter ECU 30, a steering ECU 40, an engine ECU 50, a brake ECU 60, and a navigation ECU 70. The specification references several different "units" with steps from the method of FIG. 5. The recited units may be performed by the ECUs (including one or more processors) of FIG. 1. For example, the boundary crossing determination unit, the first calculation unit, the second calculation unit, the target lateral state amount calculation unit, the target yaw state amount calculation unit, and the steering control unit may be performed by the driving support ECU 10.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to realize various functions. Some or all of those ECUs may be integrated into one ECU.

Further, a plurality of types of vehicle state sensors 80 configured to detect a vehicle state and a plurality of types of diving operation state sensors 90 configured to detect a driving operation state are connected to the CAN 100. Examples of the vehicle state sensors 80 include a vehicle speed sensor configured to detect a travel speed (hereinafter also referred to as a "vehicle speed v") of the vehicle, a front-rear G sensor configured to detect an acceleration in a front-rear direction of the vehicle, a lateral G sensor configured to detect an acceleration in a lateral direction of the vehicle, and a yaw rate sensor configured to detect a yaw rate of the vehicle.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of the operation on the brake pedal, a steering angle sensor configured to detect a steering angle, a steering torque sensor configured to detect a steering torque, and a shift position sensor configured to detect a shift position of a transmission.

Information (hereinafter, referred to as "sensor information") detected by the vehicle state sensors 80 and the driving operation state sensors 90 is transmitted to the CAN 100. Each ECU can use the sensor information transmitted to the CAN 100 as appropriate. The sensor information may be information of a sensor connected to a specific ECU, and may be transmitted from the specific ECU to the CAN 100. For example, the accelerator operation amount sensor may be connected to the engine ECU 50. In this case, the sensor information representing the accelerator operation amount is transmitted from the engine ECU 50 to the CAN 100. For example, the steering angle sensor may be connected to the steering ECU 40. In this case, the sensor information representing the steering angle is transmitted from the steering ECU 40 to the CAN 100. The same applies to the other sensors. Further, there may be employed a configuration in which, without interpolation of the CAN 100, the sensor information is transmitted and received through direct communication between specific ECUs.

Figure 2:
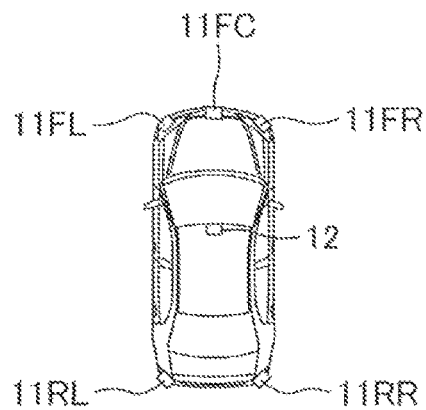
FIG. 2 is a plan view for illustrating disposing positions of surrounding sensors and a camera sensor.

The driving support ECU 10 is a control device serving as a central device for performing driving support for a driver, and executes lane change assist control, lane trace assist control, and adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration as each other except that the sensors have different detection regions. In the following, the surrounding sensors 11FC, 11FR, 11FL, 11RR, and 11RL are referred to as "surrounding sensors 11" when the sensors are not required to be individually distinguished from one another.

Each of the surrounding sensors 11 includes a radar transceiver (radar transmitting/receiving part) (not shown) and a signal processor (not shown). The radar transceiver radiates a radio wave in a millimeter waveband (hereinafter referred to as a "millimeter wave"), and receives a millimeter wave (that is, reflected wave) reflected by a three-dimensional object (e.g., other vehicles, pedestrian, bicycle, and building) present within a radiation range. The signal processor acquires, every time a predetermined time period elapses, information (hereinafter referred to as "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. By using the surrounding information, the driving support ECU 10 can detect (i) a front-rear direction component and a lateral direction component of the distance between the own vehicle and the three-dimensional object, and (ii) a front-rear direction component and a lateral direction component of the relative speed between the own vehicle and the three-dimensional object.

As illustrated in FIG. 2, the front-center surrounding sensor 11FC is disposed at a front-center portion of a vehicle body, and detects a three-dimensional object present in a front region of the own vehicle. The front-right surrounding sensor 11FR is disposed at a front-right corner portion of the vehicle body, and mainly detects a three-dimensional object present in a front-right region of the own vehicle. The front-left surrounding sensor 11FL is disposed at a front-left corner portion of the vehicle body, and mainly detects a three-dimensional object present in a front-left region of the own vehicle. The rear-right surrounding sensor 11RR is disposed at a rear-right corner portion of the vehicle body, and mainly detects a three-dimensional object present in a rear-right region of the own vehicle. The rear-left surrounding sensor 11RL is disposed at a rear-left corner portion of the vehicle body, and mainly detects a three-dimensional object present in a rear-left region of the own vehicle.

In this embodiment, the surrounding sensors 11 are radar sensors, but other sensors such as clearance sonars and LIDAR (Laser Imaging Detection and Ranging) sensors can be employed instead.

Further, a camera sensor 12 is connected to the driving support ECU 10. The camera sensor 12 includes a camera 12A and a lane recognition unit 12B. The lane recognition unit 12B analyzes image data obtained based on an image taken by the camera unit to recognize a white line(s) of a road. The camera 12A photographs a landscape in front (ahead) of the own vehicle. The lane recognition unit 12B supplies information on the recognized white line(s) to the driving support ECU 10 every time a predetermined time period elapses.

The camera sensor 12 recognizes a lane which is a region sectioned by the white lines, and detects a relative positional relationship of the own vehicle with respect to the lane based on a positional relationship between the white lines and the own vehicle. Hereinafter, the "position" of the own vehicle means the position of the center of gravity. Further, a "lateral position" of the own vehicle to be described later means the position of the center of gravity in the lane width direction. In addition, a "lateral speed" of the own vehicle means the speed of the center of gravity of the own vehicle in the lane width direction. Furthermore, a "lateral acceleration" of the own vehicle means the acceleration of the center of gravity of the own vehicle in the lane width direction. These are calculated and obtained based on the relative positional relationship between the own vehicle and the white lines detected by camera sensor 12. In the present embodiment, the position of the own vehicle refers to the position of the center of gravity, but it is not necessarily limited to the center of gravity position. A predetermined specific position (for example, the center position of the own vehicle in plan view) of the vehicle may be adopted as the position of the own vehicle.

Figure 3:
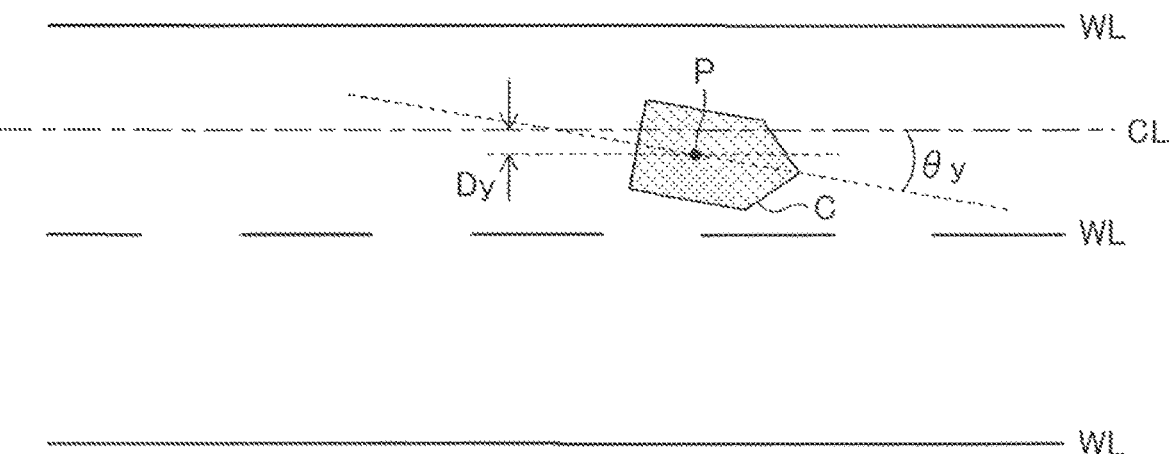
FIG. 3 is a diagram for illustrating lane-related vehicle information.

As illustrated in FIG. 3, the camera sensor 12 sets/determines a lane center line CL corresponding to a center position in a width direction of the right and left white lines WL in a lane on/in which the own vehicle is traveling. The lane center line CL is used as a target travel line in the lane trace assist control to be described later. Further, the camera sensor 12 calculates a curvature Cu of a curve K of the lane center line CL. See, e.g., FIG. 8.

Further, the camera sensor 12 calculates the position and the direction of the own vehicle in the lane sectioned by the right and left white lines WL. For example, as illustrated in FIG. 3, the camera sensor 12 calculates a distance Dy(m) in the lane width direction between the position P of the center of gravity of the own vehicle C and the lane center line CL, that is, the distance Dy by which the own vehicle C is shifted (deviates) from the lane center line CL in the lane width direction. This distance Dy is referred to as a "lateral difference Dy". Further, the camera sensor 12 calculates an angle formed between the direction of the lane center line CL and the direction in which the own vehicle C is facing/directing, that is, an angle θy(rad) by which the direction in which the own vehicle C is facing/directing is shifted (deviates) in a horizontal plane direction from the direction of the lane center line CL. This angle θy is referred to as a "yaw angle θy". When the lane is curved, because the lane center line CL is curved in the same manner, the yaw angle θy is an angle formed between the direction in which the own vehicle C is facing/directing and the direction of a tangent line of this curved lane center line CL. In the following, information (Cu, Dy, and θy) representing the curvature Cu, the lateral difference Dy, and the yaw angle θy is referred to as "lane-related vehicle information". Regarding the lane-related vehicle information, the lateral direction (right and left direction) with respect to the lane center line CL is specified by positive and negative signs.

Further, every time a predetermined time period elapses, the camera sensor 12 also supplies, to the driving support ECU 10, information relating to the white lines, for example, the type of the detected white line (solid line or broken line), a distance (lane width) between the right and left adjacent white lines, and the shape of the white line, on not only the lane of the own vehicle but also on adjacent lanes. When the white line is a solid line, the vehicle is inhibited from crossing (passing across) the white line to change lanes. Otherwise, e.g., when the white line is a broken line (white line intermittently formed at certain intervals), the vehicle is allowed to cross (pass across) the white line to change lanes. The lane-related vehicle information (Cu, Dy, and θy) and the information relating to the white lines are collectively referred to as "lane information".

In this embodiment, the camera sensor 12 calculates the lane information. Alternatively, the driving support ECU 10 may be configured to analyze the image data transmitted from the camera sensor 12 to acquire/obtain the lane information.

Further, the camera sensor 12 can also detect a three-dimensional object present in front (ahead) of the own vehicle based on the image data. Therefore, the camera sensor 12 may calculate and acquire not only the lane information but also front surrounding information. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy. The surrounding information generated by the synthesis processor may be supplied to the driving support ECU 10 as the front surrounding information on the own vehicle.

A buzzer 13 is connected to the driving support ECU 10. The buzzer 13 receives a buzzer sounding signal as input transmitted from the driving support ECU 10 and produces a sound. The driving support ECU 10 sounds the buzzer 13 when, for example, the driving support ECU 10 notifies/informs the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be energized by the notification ECU. In this configuration, the driving support ECU 10 transmits a buzzer sounding command to the notification ECU.

Further, in place of or in addition to the buzzer 13, a vibrator for transmitting vibration for notification for the driver may be provided. For example, the vibrator is provided to a steering wheel to vibrate the steering wheel, to thereby alert the driver.

The driving support ECU 10 executes the lane change assist control, the lane trace assist control, and the adaptive cruise control, based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to execute each of the lane change assist control, the lane trace assist control, and the adaptive cruise control. The driving support ECU 10 receives a setting signal as input from the setting operation unit 14 to determine whether or not to execute each control. In this case, when the execution of the adaptive cruise control is not selected, the lane change assist control and the lane trace assist control are also automatically set to be unexecuted. Further, when the execution of the lane trace assist control is not selected, the lane change assist control is also automatically set to be unexecuted.

Further, the setting operation unit 14 has a function of inputting parameters or the like representing the preference of the driver when the above-mentioned control is executed.

The electric power steering ECU 20 is a control device for an electric power steering device. In the following, the electric power steering ECU 20 is referred to as an "EPS ECU 20". The EPS ECU 20 is connected to a motor driver 21. The motor driver 21 is connected to a steering motor 22. The steering motor 22 is integrated/incorporated into a "steering mechanism including the steering wheel, a steering shaft coupled to the steering wheel, a steering gear mechanism, and the like" (not shown) of the vehicle. The EPS ECU 20 detects the steering torque that is input by the driver to the steering wheel (not shown) with the steering torque sensor mounted in the steering shaft, and controls energization of the motor driver 21 based on the steering torque to drive the steering motor 22. The assist motor is driven as described above to apply/add the steering torque to the steering mechanism, and thus the steering operation of the driver is assisted.

Further, when the EPS ECU 20 receives a steering command from the driving support ECU 10 via the CAN 100, the EPS ECU 20 drives the steering motor 22 at a control amount specified by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

The meter ECU 30 is connected to a display unit 31 and right and left turn signals 32 (meaning turn signal lamps and sometimes also referred to as "turn lamps"). The display unit 31 is, for example, a multi-information display mounted in front of a driver's seat, and displays various types of information in addition to values measured by meters, for example, a vehicle speed. For example, when the meter ECU 30 receives a display command in accordance with the driving support state from the driving support ECU 10, the meter ECU 30 displays a screen instructed through the display command on the display unit 31. As the display unit 31, in place of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 intermittently flashes the turn signal 32 arranged at a right or left position of the own vehicle according to the turn signal flashing command. Further, while the meter ECU 30 intermittently flashes the turn signal 32, the meter ECU 30 transmits, to the CAN 100, turn signal flashing information representing that the turn signal 32 is in an intermittently flashing state. Therefore, other ECUs can recognize the intermittently flashing state of the turn signal 32.

The steering ECU 40 is connected to a turn signal lever 41. The turn signal lever 41 is an operation unit for working (intermittently flashing) the turn signal 32, and is mounted in a steering column. The turn signal lever 41 is mounted to be swingable about a support shaft with/at a two-stage operation stroke in each of a clockwise operation direction and a counterclockwise operation direction.

Figure 4:
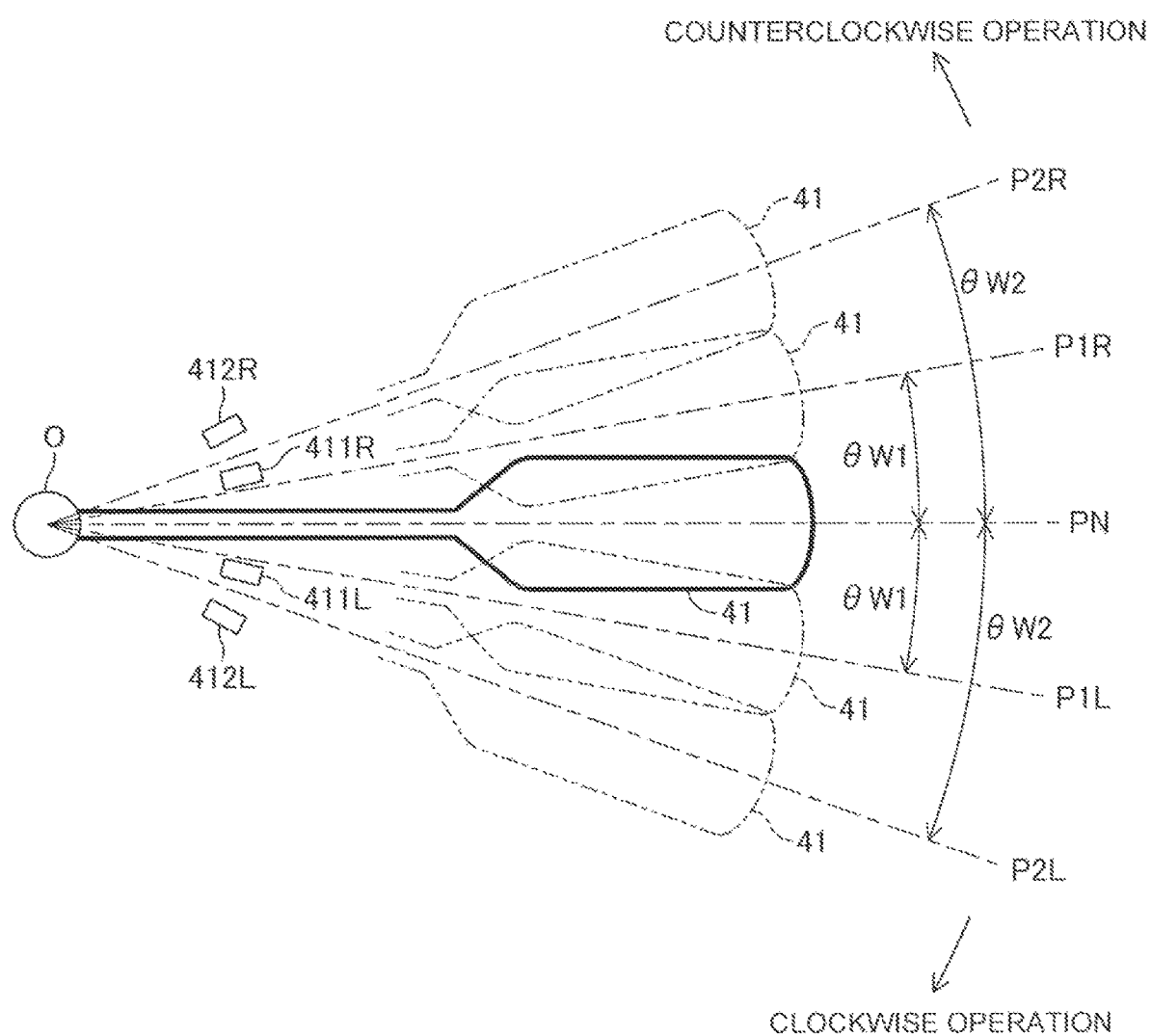
FIG. 4 is a diagram for illustrating actuation of a turn signal lever.

In this embodiment, the turn signal lever 41 is also used as an operation unit operated by the driver when the driver requires the execution of the lane change assist control. As illustrated in FIG. 4, the turn signal lever 41 is configured to be able to be operated selectively between (i) a first stroke position P1L (P1R), which is a position at which the turn signal lever 41 is rotated by a first angle θW1 from a neutral position PN, and (ii) a second stroke position P2L (P2R), which is a position at which the turn signal lever 41 is rotated by a second angle θW2 (>θW1) from the neutral position PN, in each of the clockwise operation direction and the counterclockwise operation direction about a support shaft O. In a state in which the turn signal lever 41 is in the first stroke position P1L (P1R), when the driver cancels the lever operation (that is, the driver releases his/her hand from the turn signal lever 41), the turn signal lever 41 is automatically returned to the neutral position PN. In a state in which the turn signal lever 41 is in the second stroke position P2L (P2R), even when the driver cancels the lever operation, the turn signal lever 41 is held/maintained at the second stroke position P2L (P2R) by a mechanical lock mechanism (not shown). Further, in a state in which the turn signal lever 41 is held at the second stroke position P2L (P2R), when the steering wheel is reversely rotated to be returned to the neutral position, or when the driver operates the turn signal lever 41 to return the turn signal lever 41 in the neutral position direction, the locking by the lock mechanism is released, and the turn signal lever 41 is returned to the neutral position PN.

The turn signal lever 41 includes a first switch 411L (411R) that is turned on only when the turn signal lever 41 is tilted/rotated so as to be at the first stroke position P1L (P1R), and a second switch 412L (412R) that turns on only when the turn signal lever 41 is tilted/rotated to so as to be at the second stroke position P2L (P2R).

The steering ECU 40 detects an operation state of the turn signal lever 41 based on the state of the first switch 411L (411R) and the state of the second switch 412L (412R). In each of the state in which turn signal lever 41 is tilted to the first stroke position P1L (P1R), and the state in which the turn signal lever 41 is tilted to the second stroke position P2L (P2R), the steering ECU 40 transmits to the meter ECU 30 the turn signal flashing command including information representing the operation direction (clockwise or counterclockwise direction) of the turn signal lever 41.

Further, when the steering ECU 40 detects that the turn signal lever 41 is continuously held at the first stroke position P1L (P1R) for a predetermined set time (lane-change-request-determination time: for example, 1 second) or more, the steering ECU 40 outputs/transmits to the driving support ECU 10 a lane change assist request signal including the information representing the operation direction (clockwise or counterclockwise direction) of the turn signal lever 41. Therefore, when the driver wishes to receive assistance for lane change (assistance provided by the lane change assist control) during driving, the driver may tilt the turn signal lever 41 to the first stroke position P1L (P1R) in a lane change direction, and hold the turn signal lever 41 for the predetermined set time or more. Such an operation is referred to as a "lane change assist request operation".

In this embodiment, the turn signal lever 41 is used as the operation unit for requesting the lane change assist control. Alternatively, a dedicated operation unit for requesting the lane change assist control may be provided in the steering wheel and the like.

The engine ECU 50 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration) of the own vehicle.

The brake ECU 60 is connected to a brake actuator 61. The brake actuator 61 is provided in a hydraulic circuit between a "master cylinder (not shown) configured to pressurize a working fluid in response to a stepping force on a brake pedal" and "friction brake mechanisms 62 provided at the front/rear left/right wheels". The friction brake mechanism 62 includes a brake disk 62a fixed to the wheel and a brake caliper 62b fixed to the vehicle body. The brake actuator 61 is configured to adjust a hydraulic pressure supplied to a wheel cylinder included in the brake caliper 62b in accordance with an instruction from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle.

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and performs various types of calculation processing based on the position of the own vehicle and the map information and the like stored in the map database 72, to thereby perform route guidance with use of the touch panel 73.

The map information stored in the map database 72 includes road information. The road information includes parameters (e.g., road curvature radius or curvature representing the degree of the curve of the road, the road lane width, the number of lanes of the road, and the position of the lane center line CL of each lane) representing the shape and the position of the road for each section of the road. Further, the road information includes road type information for enabling distinction of whether or not the road is a road for exclusive use by automobiles, and the like.

<Control Processing Performed by Driving Support ECU 10>

Next, control processing performed by the driving support ECU 10 is described. Under a state in which both of the lane trace assist control and the adaptive cruise control are being executed, when the lane change assist request is accepted, the driving support ECU 10 executes the lane change assist control. In view of this, the lane trace assist control and the adaptive cruise control are first described.

<Lane Trace Assist Control (LTA)>

The lane trace assist control provides/generates the steering torque applied to the steering mechanism so that the position of the own vehicle is maintained in the vicinity of the target travel line inside a "lane in which the own vehicle is traveling", thereby assisting the steering operation of the driver. In this embodiment, the target travel line is the lane center line CL, but a line offset/shifted in the lane width direction by a predetermined distance from the lane center line CL can also be adopted as the target travel line.

In the following, the lane trace assist control is referred to as an "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has various names. Thus, a brief description on the LTA is now given.

The driving support ECU 10 is configured to carry out the LTA when the LTA is requested through the operation applied to the setting operation unit 14. When the LTA is requested, the driving support ECU 10 calculates a target steering angle $\theta lta^*$ in accordance with Expression (1) based on the above-mentioned lane-related vehicle information (Cu, Dy, and $\theta y$) every time a predetermined time period (calculation period) elapses.

$$\theta lta^* = Klta1 \cdot Cu + Klta2 \cdot \theta y + Klta3 \cdot Dy + Klta4 \cdot \Sigma Dy \tag{1}$$

In Expression (1), Klta1, Klta2, Klta3, and Klta4 are control gains. The first term on the right-hand side is a steering angle component that is determined in accordance with the curvature Cu of the road and acts in a feed-forward manner. The second term on the right-hand side is a steering angle component that acts in the feed-back manner so that the yaw angle $\theta y$ is decreased (so that the difference between the direction of the own vehicle and the lane center line CL is decreased). That is, the second term on the right-hand side is a steering angle component calculated by feed-back control with the target value of the yaw angle $\theta y$ being set to zero. The third term on the right-hand side is a steering angle component that acts in a feed-back manner so that the lateral difference Dy, which is a positional gap (positional difference) between the own vehicle and the lane center line CL in the lane width direction, is decreased. That is, the third term on the right-hand side is a steering angle component calculated by feed-back control with the target value of the lateral difference Dy being set to zero. The fourth term on the right-hand side is a steering angle component that acts in a feed-back manner so that an integral value $\Sigma Dy$ of the lateral difference Dy is decreased. That is, the fourth term on the right-hand side is a steering angle component calculated by feed-back control with the target value of the integral value $\Sigma Dy$ being set to zero.

A target steering angle θlta* becomes an angle to have the own vehicle travel toward the left direction, for example,
- when the lane center line CL curves to the left (direction),
- when the own vehicle is laterally shifted/deviated in the right direction from the lane center line CL, or
- when the own vehicle is facing/directing to the right (direction) with respect to the lane center line CL.

Further, a target steering angle θlta* becomes an angle to have the own vehicle travel toward the right direction,
- when the lane center line CL curves to the right (direction),
- when the own vehicle is laterally shifted/deviated in the left direction from the lane center line CL, or
- when the own vehicle is facing/directing to the left (direction) with respect to the lane center line CL.

Therefore, a calculation according to the Expression (1) is made with use of symbols (plus and minus) corresponding to the right/left direction.

The driving support ECU 10 outputs/transmits, to the EPS ECU 20, a command signal including information on (representing) the target steering angle θlta* that is the calculation result. The EPS ECU 20 controls (drives) the steering motor 22 so that the steering angle follows (becomes equal to) the target steering angle θlta*. In this embodiment, the driving support ECU 10 outputs/transmits the command signal including information on (representing) the target steering angle θlta* to the EPS ECU 20, but the driving support ECU 10 may calculate a target torque for obtaining the target steering angle θlta*, and output/transmit, to the EPS ECU 20, a command signal including information on (representing) the target torque that is the calculation result. The above is the outline of the LTA.

<Adaptive Cruise Control (ACC)>

When a preceding vehicle traveling immediately ahead of the own vehicle is present, the adaptive cruise control has the own vehicle follow the preceding vehicle while maintaining an inter-vehicle distance between the preceding vehicle and the own vehicle at a predetermined distance, based on the surrounding information. When there is no preceding vehicle, the adaptive cruise control has the own vehicle travel at a constant set vehicle speed. In the following, the adaptive cruise control is referred to as an "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description on the ACC is now given.

The driving support ECU 10 is configured to carry out the ACC when the ACC is requested through the operation applied to the setting operation unit 14. That is, the driving support ECU 10 is configured to select a following-objective-vehicle based on the surrounding information acquired from the surrounding sensors 11 when the ACC is requested. For example, the driving support ECU 10 determines whether or not an other-vehicle(s) is in a following-objective-vehicle area defined in advance.

When the other-vehicle is in the following-objective-vehicle area for a predetermined time period or more, the driving support ECU 10 selects the other-vehicle as the following-objective-vehicle. The driving support ECU 10 sets a target acceleration in such a manner that the own vehicle follows the following-objective-vehicle. Further, when no other-vehicle is present in the following-objective-vehicle area, the driving support ECU 10 sets the target acceleration based on a set vehicle speed and a detected vehicle speed (vehicle speed detected by the vehicle speed sensor) in such a manner that the detected vehicle speed of the own vehicle matches (becomes equal to) the set vehicle speed.

The driving support ECU 10 uses the engine ECU 50 to control the engine actuator 51, and, depending on necessity, uses the brake ECU 60 to control the brake actuator 61 so that the acceleration of the own vehicle matches (becomes equal to) the target acceleration. On the other hand, when the driver operates the accelerator pedal during the ACC, the driving support ECU 10 prioritizes the accelerator pedal operation over the ACC, thereby accelerating the own vehicle according to the accelerator pedal operation.

The above is the outline of the ACC.

<Lane Change Assist Control (LCA)>

The lane change assist control will next be described. After the surrounding of the own vehicle is monitored and it is determined that the own vehicle can safely change lanes, the lane change assist control provides/generates a steering torque to the steering mechanism so that the lane change assist control has the own vehicle move from the lane in which the own vehicle is currently traveling to the adjacent lane while monitoring the surrounding of the own vehicle. Thus, the driver's steering operation (lane change operation) is assisted. That is, the lane change assist control can have the own vehicle change lanes without the driver's steering operation (steering wheel operation). In the following, the lane change assist control is referred to as "LCA".

Similarly to the LTA, the LCA is control of a lateral position of the own vehicle with respect to the lane, and is executed in place of the LTA when the lane change assist request is accepted while the LTA and the ACC are being executed. In the following, the LTA and the LCA are collectively referred to as "steering assist control", and the state of the steering assist control is referred to as "steering assist control state".

Figure 5:
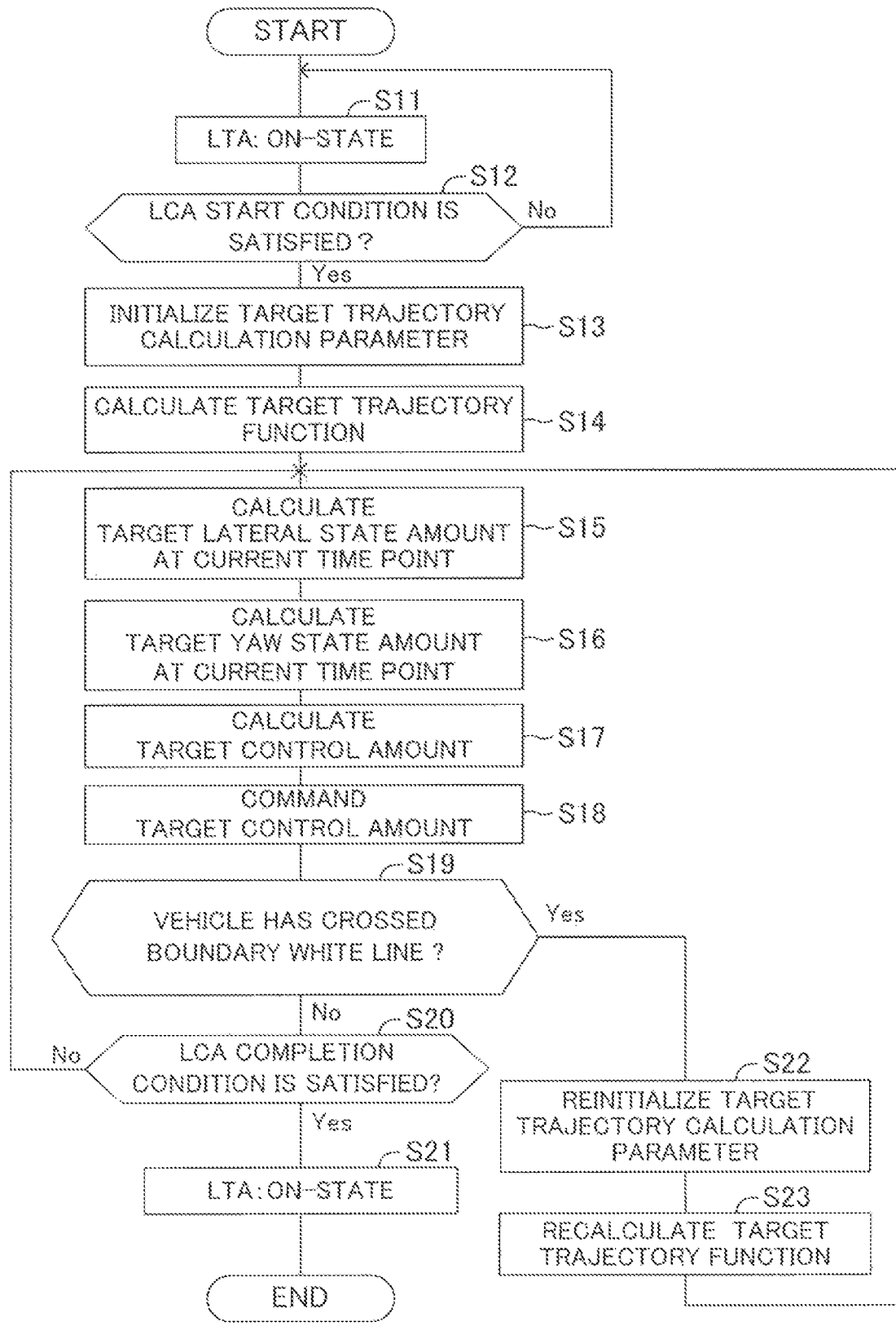
FIG. 5 is a flowchart for illustrating a steering assist control routine according to the embodiment.

FIG. 5 illustrates a steering assist control routine executed by the driving support ECU 10. The steering assist control routine is executed when a LTA execution accept condition is satisfied. The LTA execution accept condition is satisfied when all of the following conditions and the like are satisfied.
- The execution of the LTA has been selected by use of the setting operation unit 14.
- The ACC is being executed.
- The white lines have been recognized by the camera sensor 12.

As the driving support ECU 10 starts the steering assist control routine, at step S11, the driving support ECU 10 sets the steering assist control state to a "LTA ON-state" to execute the LTA. The "LTA ON-state" refers to the control state in which the LTA is executed.

Next, at step S12, the driving support ECU 10 determines whether or not a LCA start condition is satisfied.

For example, the LCA start condition is satisfied when all of the following conditions (1) to (6) are satisfied.
1. The lane change assist request operation has been detected.
2. The execution of the LCA has been selected by use of the setting operation unit 14.
3. The white line at the side on which the turn signal 32 is flashing is a broken line. That is, the white line which is the boundary between the lane (referred to as an "original lane") in which the own vehicle is currently traveling and a lane adjacent to the original lane (referred to as an "adjacent lane" or a "target lane") is a broken line.

4. It is determined, based on the result of monitoring the surroundings of the own vehicle, that the current situation around the own vehicle is a situation in which the LCA is allowed to be executed. That is, no obstacle (e.g., other vehicles, etc.) which obstructs the lane change is detected by the surrounding sensors 11, and thus, the driving support ECU 10 has determined that the lane change can be executed safely.
5. The road on the own vehicle is traveling is a road for exclusive use of automobiles. That is, the road type information acquired from the navigation ECU 70 represents that a road on which the own vehicle is traveling is for exclusive use of automobiles.
6. The vehicle speed of the own vehicle is within a predetermined vehicle speed range for accepting the execution of the LCA.

For example, even when an other-vehicle is present in the target lane, if an inter-vehicle distance between the own vehicle and that other-vehicle traveling in the target lane is suitably/sufficiently ensured in view of a relative speed between the own vehicle and that other-vehicle, the above-mentioned condition 4 is satisfied.

The LCA start condition is not limited to the above-mentioned conditions 1 to 6. In place of one of the conditions 1 to 6, or in addition to the conditions 1 to 6, the LCA start condition may include other conditions.

When the LCA start condition is not satisfied, the driving support ECU 10 returns to step S11 and continues the execution of the LTA.

When the LCA start condition is satisfied during the execution of the LTA (S12: Yes), the driving ECU 10 executes the LCA in place of the LTA. At the start of the LCA, the driving support ECU 10 transmits to the meter ECU 30 a command for displaying start-guidance for the LCA. Therefore, the start-guidance for the LCA is displayed on the display unit 31.

When the driving support ECU 10 starts the LCA, at step S13, the driving support ECU 10 first executes a process for initializing target trajectory calculation parameters. The target trajectory calculation parameters are used for calculation of a target trajectory. The target trajectory for the LCA will be described below.

Figure 6:
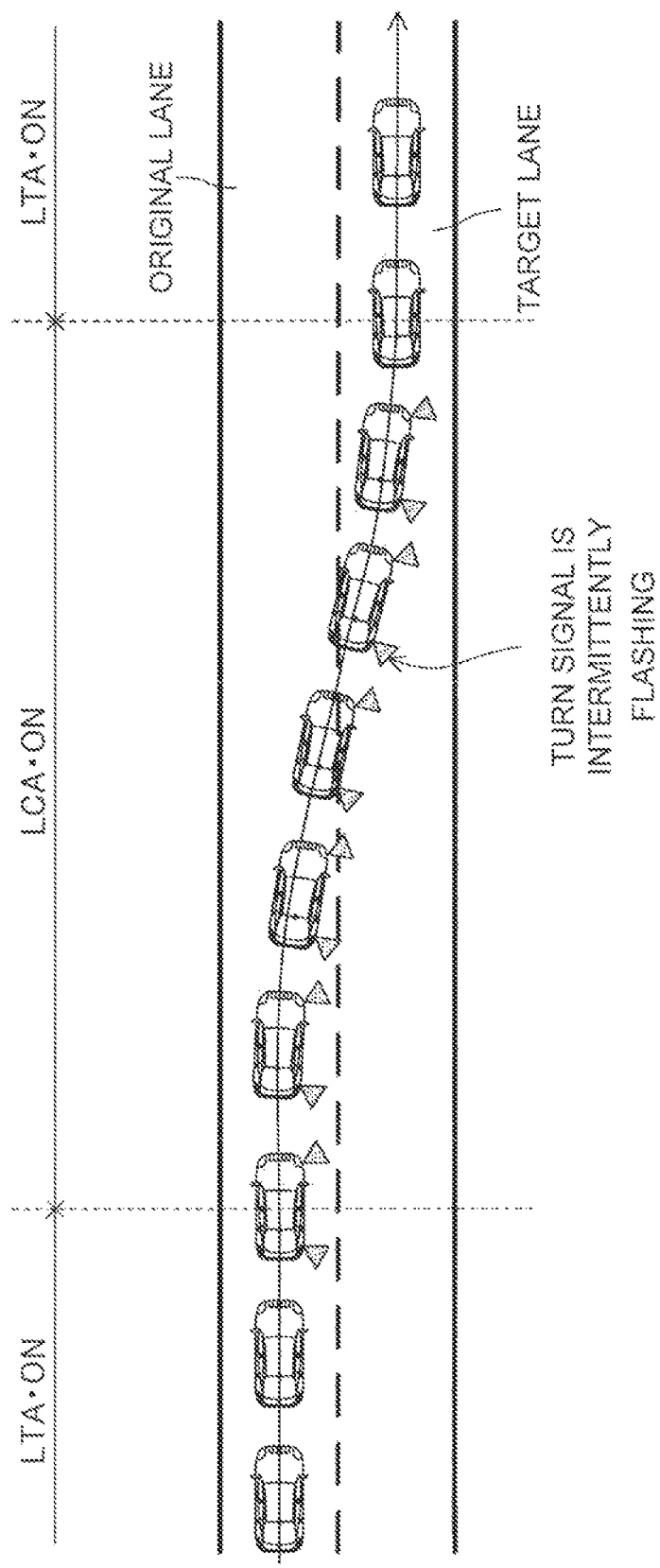
FIG. 6 is a diagram for illustrating a trajectory of the vehicle.

When executing the LCA, the driving support ECU 10 determines/specifies a target trajectory function for defining/determining the target trajectory of the own vehicle. The target trajectory is a trajectory along which the own vehicle is to be moved, for a "target lane change time period", from the lane (original lane) in which the own vehicle is currently traveling to the center position in the width direction (referred to as a "final target lateral position") of the target lane specified by the information included in the lane change assist request signal, which is adjacent to the original lane. The target trajectory has, for example, a shape as illustrated in FIG. 6.

As described later, the target trajectory function is a function of an elapsed time from the start of the LCA (as a variable), and for calculating a target lateral position of the own vehicle for (corresponding to) each elapsed time with reference to the lane center line CL of the original lane. Here, the lateral position of the own vehicle represents the position of the center of gravity of the own vehicle in the lane width direction (also referred to as "lateral direction") with reference to the lane center line CL (origin). Further, as described later, the lane center line CL as a reference which is used for calculating the lateral position is the lane center line CL of the "original lane" before the vehicle has crossed (passed across) the boundary (white line) between the original lane and the target lane. On the other hand, after the vehicle has crossed the boundary between the original lane and the target lane, the lane center line CL as a reference is the lane center line CL of the "target lane". Hereinafter, the white line which is the boundary between the original lane and the target lane is referred to as a "boundary white line WLD".

The target lane change time period is varied in proportion to a distance (hereinafter referred to as a "necessary lateral distance") required to move the own vehicle in the lateral direction from the initial (lateral) position at the start of the LCA to the final target lateral position. When the lane width is 3.5 m as in the case of typical roads, the target lane change time period is set to, for example, 8.0 seconds. This example corresponds to a case in which the own vehicle is positioned on the lane center line CL of the original lane at the start of the LCA. When the lane width is, for example, 4.0 m, the target lane change time period is set to 9.1 (=8.0×4.0/3.5) seconds which is a value corresponding to the lane width.

Further, when the lateral position of the own vehicle at the start of the LCA is shifted/deviated toward the target lane (i.e., to the adjacent lane side of a destination of changing lanes) with respect to the lane center line CL of the original lane, the target lane change time period is decreased (is made shorter) as the shift/deviation amount (magnitude of the lateral difference Dy) is increased. On the other hand, when the lateral position of the own vehicle at the start of the LCA is shifted/deviated to a side opposite to the target lane with respect to the lane center line CL of the original lane, the target lane change time period is increased (is made longer) as the shift/deviation amount (magnitude of the lateral difference Dy) is increased. For example, when the shift/deviation amount is 0.5 m, the increase/decrease adjustment amount of the target lane change time period may be 1.14 (=8.0×0.5/3.5) seconds. The above-mentioned values for setting the target lane change time period are merely examples, and thus, any other values may be adopted.

In this embodiment, the target lateral position y is calculated in accordance with the target trajectory function y(t) expressed by Expression (2). The target trajectory function y(t) is a fifth-order function of the elapsed time t serving as a variable.

$$y(t)=c_0+c_1 \cdot t+c_2 t^2+c_3 \cdot t^3+c_4 \cdot t^4+c_5 \cdot t^5 \qquad (2)$$

This target trajectory function y(t) is a function for moving the own vehicle to the final target lateral position smoothly.

In Expression (2), the constants $c_0$, $c_1$, $c_2$, $c_3$, $c_4$, and $c_5$ are determined based on a state (i.e., an "initial lateral state amount" to be described later) of the own vehicle at the start of the LCA and a target state (i.e., a "final target lateral state amount" to be described later) of the own vehicle at the completion of the LCA.

Figure 7:
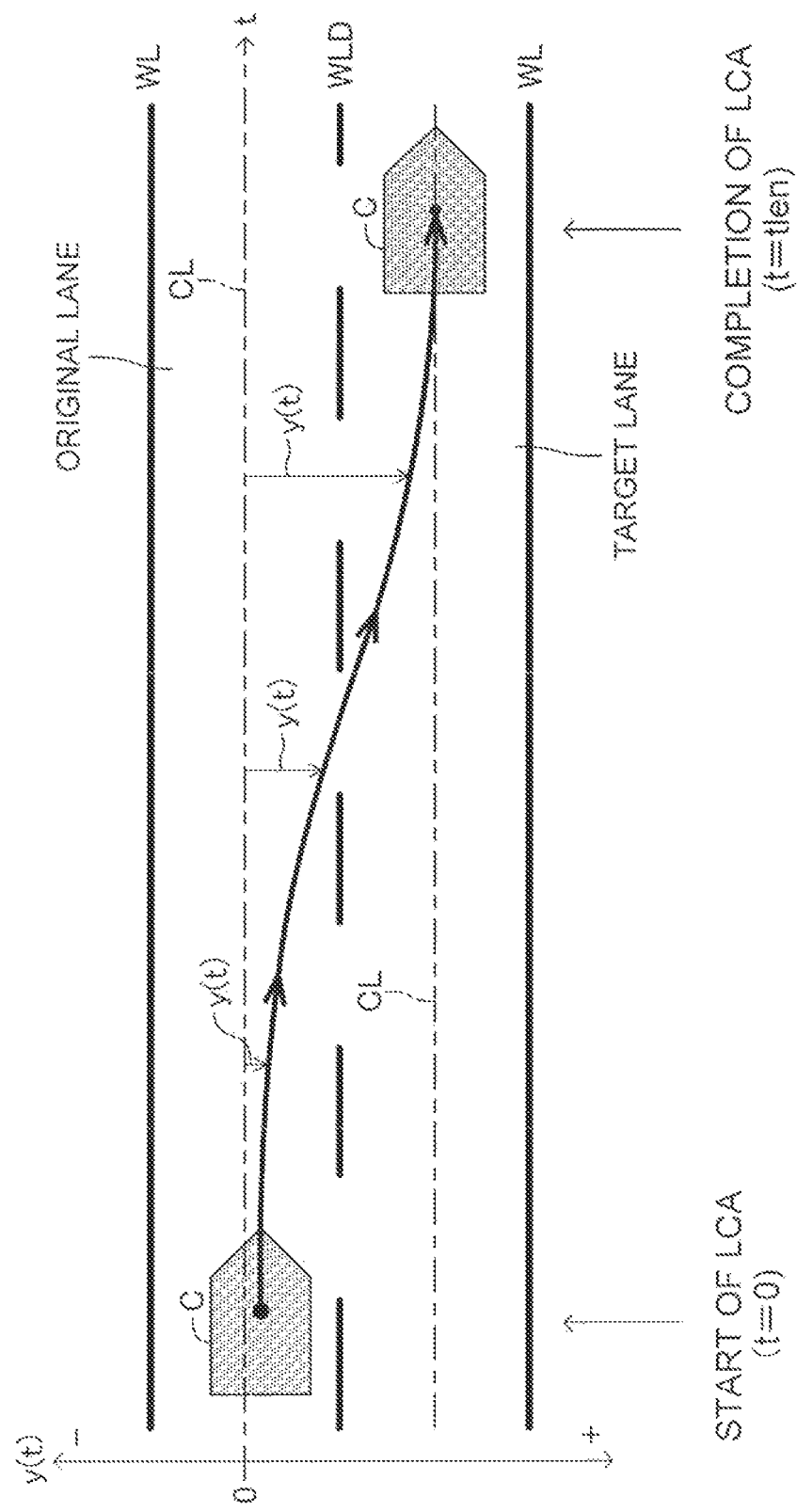
FIG. 7 is a diagram for illustrating a target trajectory function.
Figure 8:
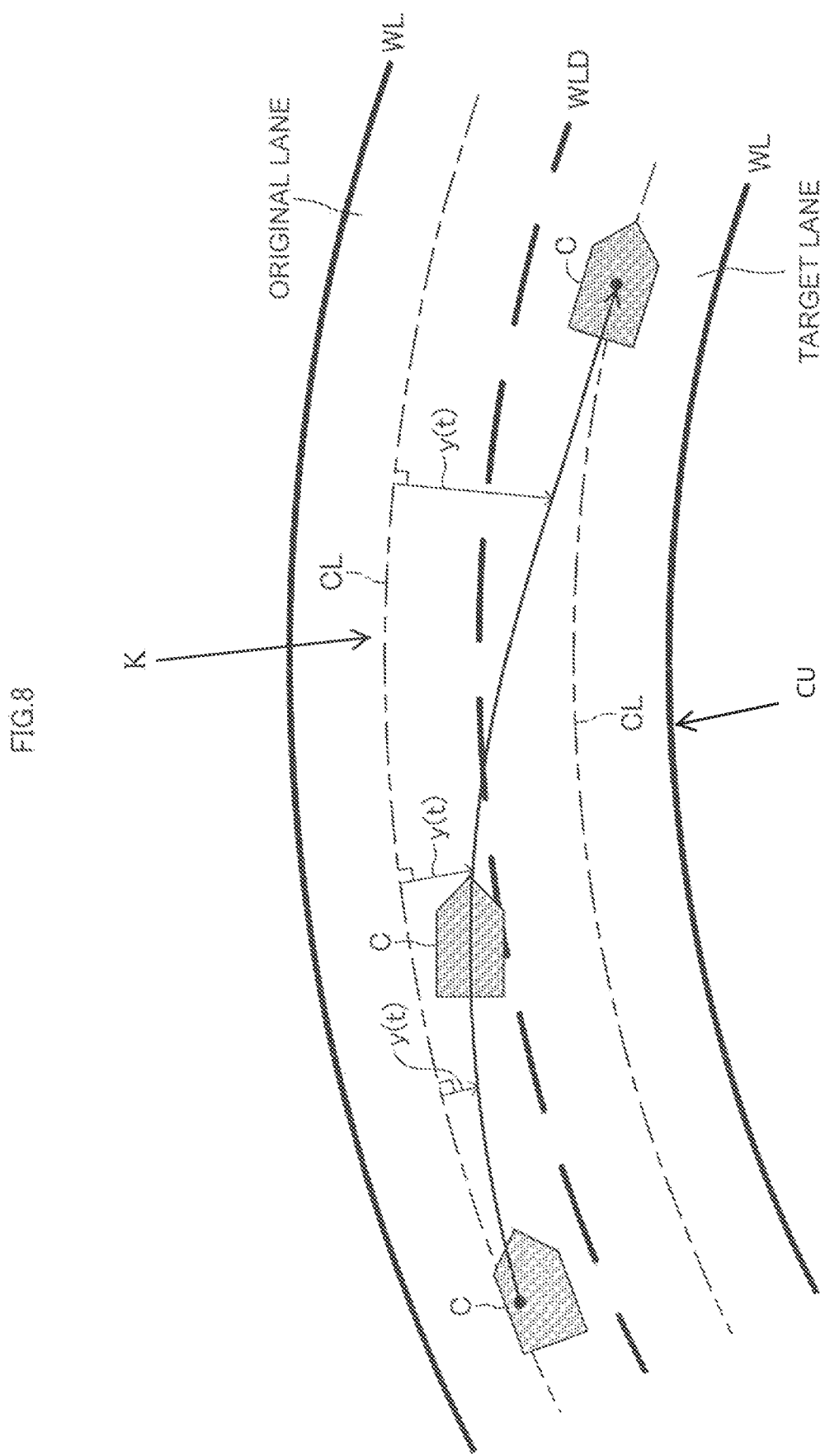
FIG. 8 is a diagram for illustrating a target trajectory function.

For example, as illustrated in FIG. 7, the target trajectory function y(t) is a function for calculating the target lateral position y of the own vehicle C corresponding to an elapsed time t (also referred to as the "present time") from the start of the LCA (at the time of the calculation of the target trajectory), with reference to the lane center line CL of the lane (original lane) in which the own vehicle C is currently traveling. In FIG. 7, both of the original lane and the target lane are straight. However, in a case in which both of the original lane and the target lane are curved, as illustrated in FIG. 8, the target trajectory function y(t) can be said to be a function for calculating the target lateral position y of the own vehicle C with respect to the curved lane center line CL of the original lane, using the curved lane center line CL as the reference/standard line.

As described later, the target trajectory function y(t) is recalculated (determined again) after the own vehicle has crossed the boundary white line WLD by use of the LCA. At that time, the target trajectory function y(t) is switched from the target trajectory function representing/expressing the target lateral position of the own vehicle C with reference to the lane center line CL of the original lane to the target trajectory function representing/expressing the target lateral position of the own vehicle C with reference to the lane center line CL of the target lane.

The above-mentioned target trajectory calculation parameters include parameters for defining/determining the constants $c_0$, $c_1$, $c_2$, $c_3$, $c_4$, and $c_5$ of the target trajectory function y(t). Specifically, the target trajectory calculation parameters include the following parameters P1 to P7.

P1: the lateral position (hereinafter referred to as an "initial lateral position") of the own vehicle with respect to the lane center line of the original lane at the start of the LCA.

P2: the speed (hereinafter referred to as an "initial lateral speed") of the own vehicle in the lateral direction at the start of the LCA.

P3: the acceleration (hereinafter referred to as an "initial lateral acceleration") of the own vehicle in the lateral direction at the start of the LCA.

P4: the target lateral position (final target lateral position) of the own vehicle with respect to the lane center line of the original lane at the completion of the LCA.

P5: a target speed (hereinafter referred to as a "final target lateral speed") of the own vehicle in the lateral direction at the completion of the LCA.

P6: a target acceleration (hereinafter referred to as a "final target lateral acceleration") of the own vehicle in the lateral direction at the completion of the LCA.

P7: the target lane change time period which is a target time period from the start of the LCA to the completion of the LCA (i.e., a time length of a period while the LCA is executed).

Further, the above-mentioned lateral direction means the width direction of the lane.

The camera sensor 12 outputs the lane information on each of lanes which have been detected in front of (ahead) the own vehicle. When the steering assist control is being executed/performed, the driving support ECU 10 uses the lane information on the lane center line CL of the lane in which the own vehicle is traveling (being positioned). The camera sensor 12 appends, to the lane information on the lane in which the own vehicle is currently traveling, predetermined identification information for distinguishing "the lane information on the lane in which the own vehicle is currently traveling" from the lane information on another lane. In this manner, the camera sensor 12 outputs the lane information on each of the lanes. While the LCA is being executed/performed, the driving support ECU 10 acquires the lane information on the lane in which the own vehicle is traveling based on the identification information. Therefore, at the start of the LCA, the driving support ECU 10 uses the lane information (including the lane-related vehicle information (Cu, Dy, and θy), and information on the lane width and the type of right and left white lines, etc.) on the original lane.

The initial lateral position is set to the same value as the lateral difference Dy detected by the camera sensor 12 at the start of the LCA. The initial lateral speed is set to a value (v·sin(θy)) obtained by multiplying a vehicle speed v by a sine value (sin(θy)) of the yaw angle θy. The vehicle speed v is a value detected by the vehicle speed sensor at the start of the LCA, and the yaw angle θy is a value detected by the camera sensor 12 at the start of the LCA. Further, the initial lateral acceleration may be set to a differential value of the initial lateral speed. However, the initial lateral acceleration may be preferably set to a value (v·γ) obtained by multiplying a yaw rate γ (rad/s) detected by the yaw rate sensor at the start of the LCA by the vehicle speed v. This is because, in the case where the yaw rate γ (rad/s) detected by the yaw rate sensor is used, the change in the behavior of the own vehicle can be detected more quickly than in the case where the yaw angle θy detected by the camera sensor 12 is used. The initial lateral position, the initial lateral speed, and the initial lateral acceleration are collectively referred to as an "initial lateral state amount (or, index, quantity)".

In this embodiment, it is considered/regarded that the lane width of the target lane is the same as the lane width of the original lane detected by the camera sensor 12 (since the lane width of the target lane is the same as that of the original lane in most cases). Therefore, in the case where the own vehicle is traveling on the lane center line CL of the original lane, the final target lateral position is set to the same value as the lane width of the original lane (the final target lateral position=the lane width of the original lane). Further, both of the final target lateral speed and the final target lateral acceleration are set to zero. The final target lateral position, the final target lateral speed, and the final target lateral acceleration are collectively referred to as a "final target lateral state amount (or index, quantity)".

As described above, the target lane change time period is calculated based on the lane width (which may be the lane width of the original lane) and the shift/deviation amount of the own vehicle in the lateral direction at the start of the LCA. For example, the target lane change time period "tlen" is calculated in accordance with Expression (3).

$$tlen = Dini \cdot A \qquad (3)$$

"Dini" is a necessary distance for moving the own vehicle in the lateral direction from the position (initial lateral position) at the start of the LCA to the position (final target lateral position) at the completion of the LCA. Therefore, in the case where the own vehicle is positioned at the lane center line CL of the original lane at the start of the LCA, "Dini" is set to the same value as the lane width. In the case where the own vehicle is shifted/deviated from the lane center line CL of the original lane, "Dini" is set to a value obtained by adding the shift/deviation amount to the lane width or obtained by subtracting the shift/deviation amount from the lane width. "A" is a constant which is a "target time" taken for moving the own vehicle in the lateral direction by a unit distance, and is set to 2.29 sec/m (=8 sec/3.5 m), for example. In this case, when the "required distance Dini" for moving the own vehicle in the lateral direction is 3.5 m, the "target lane change time period tlen" is set to 8 seconds.

The constant A is not limited to the above-mentioned value, but may be set to any value. Further, the setting operation unit 14 may be configured in such a manner that the driver can select a value as the constant A from a plurality of values by using the setting operation unit 14 according to the driver's preference. Alternatively, the target lane change time period may be a fixed value.

The process for initializing the target trajectory calculation parameters at step S13 is the process for setting the above-mentioned seven parameters (the initial lateral position, the initial lateral speed, the initial lateral acceleration, the final target lateral position, the final target lateral speed, the final target lateral acceleration, and the target lane change time period) in the manner described above.

After executing the process for initializing the target trajectory calculation parameters at step S13, the driving support ECU 10 executes a derivation process of (for determining) the target trajectory function at step S14. Specifically, the driving support ECU 10 calculates the constants $c_0$, $c_1$, $c_2$, $c_3$, $c_4$, and $c_5$ of the target trajectory function y(t) expressed by Expression (2) based on the initial lateral state amount, the final target lateral amount, and the target lane change time period, to thereby define/finalize the target trajectory function y(t).

The lateral speed y'(t) is expressed by Expression (4) based on the target trajectory function y(t) expressed by Expression (2). Further, the lateral acceleration y"(t) is expressed by Expression (5).

$$y'(t)=c_1+2 \cdot c_2 \cdot t+3 \cdot c_3 \cdot t^2+4 \cdot c_4 \cdot t^3+5 \cdot c_5 \cdot t^4 \qquad (4)$$

$$y''(t)=2 \cdot c_2+6 \cdot c_3 \cdot t+12 \cdot c_4 \cdot t^2+20 \cdot c_5 \cdot t^3 \qquad (5)$$

Here, the initial lateral position is represented by "y0", the initial lateral speed is represented by "vy0", the initial lateral acceleration is represented by "ay0", the final target lateral position is represented by "y1", the final target lateral speed is represented by "vy1", the final target lateral acceleration is represented by "ay1", and the lane width of the original lane is represented by "W". Based on the above-mentioned target trajectory calculation parameters, the following Expressions are obtained.

$$y(0)=c_0=y0 \qquad (6)$$

$$y'(0)=c_1=vy0 \qquad (7)$$

$$y''(0)=2 \cdot c_2=ay0 \qquad (8)$$

$$y(tlen)=c_0+c_1 \cdot tlen+c_2 \cdot tlen^2+c_3 \cdot tlen^3+c_4 \cdot tlen^4+c_5 \cdot tlen^5=y1=W \qquad (9)$$

$$y'(tlen)=c_1+2 \cdot c_2 \cdot tlen+3c_3 \cdot tlen^2+4 \cdot c_4 \cdot tlen^3+5 \cdot c_5 \cdot tlen^4=vy1=0 \qquad (10)$$

$$y''(tlen)=2 \cdot c_2+6 \cdot c_3 \cdot tlen+12 \cdot c_4 \cdot tlen^2+20 \cdot c_5 \cdot tlen^3=ay1=0 \qquad (11)$$

Therefore, from the above Expressions (6) to (11), the constants $c_0$, $c_1$, $c_2$, $c_3$, $c_4$, and $c_5$ of the target trajectory function y(t) are obtained. Subsequently, through substituting the obtained constants $c_0$, $c_1$, $c_2$, $c_3$, $c_4$, and $c_5$ for Expression (2), the target trajectory function y(t) is derived/defined. At the same time as the derivation of the target trajectory function y(t), the driving support ECU 10 activates a clock timer (initial value: zero) to start counting up the elapsed time t from the start of the LCA.

Next, at step S15, the driving support ECU 10 calculates a target lateral state amount of the own vehicle at the current time point. The target lateral state amount includes a target lateral position which is a target value of the lateral position of the own vehicle in the lane width direction, a target lateral speed which is a target value of the speed (lateral speed) of the own vehicle in the lane width direction, and a target lateral acceleration which is a target value of the acceleration (lateral acceleration) of the own vehicle in the lane width direction. The lateral speed and the lateral acceleration are collectively referred to as a "lateral movement state amount". The target lateral speed and the target lateral acceleration are collectively referred to as a "target lateral movement state amount".

The driving support ECU 10 calculates the target lateral position at the current time point, the target lateral speed at the current time point, and the target lateral acceleration at the current time point, based on the target trajectory function y(t) derived/defined at step S14 and the present time "t". The present time "t" is the elapsed time after the target trajectory function y(t) has been derived/defined at step S14, which is equivalent to the elapsed time from the start of the LCA, as can be understood from processes described later. As described above, after the driving support ECU 10 derives/determines the target trajectory function y(t) at step S14, the driving support ECU 10 resets the dock timer to start counting up the elapsed time "t" (=the present time t) from the start of the LCA. The target lateral position is calculated through applying/assigning the present time t to the target trajectory function y(t). The target lateral speed is calculated through applying/assigning the present time t to the function y'(t) obtained by first-order differentiating the target trajectory function y(t). The target lateral acceleration is calculated through applying/assigning the present time t to the function y"(t) obtained by second-order differentiating the target trajectory function y(t). The driving support ECU 10 reads the elapsed time t measured by the clock timer. The driving support ECU 10 calculates the target lateral state amount based on the measured elapsed time t and the above-mentioned functions.

Hereinafter, the target lateral position at the present time t is represented by "y*", the target lateral speed at the present time t is represented by "vy*", and the target lateral acceleration at the present time t is represented by "av*". A functional unit/module of the driving support ECU 10 for calculating the target lateral position y*, the target lateral speed vy* and the target lateral acceleration av* at step S15 corresponds to a "target lateral state amount calculation unit" of the present invention.

Next, at step S16, the driving support ECU 10 calculates a target yaw state amount which is a target value relating to a movement for changing the direction of the own vehicle (direction of the vehicle body). The target yaw state amount includes a target yaw angle θy* of the own vehicle at the present time t (current time point t), a target yaw rate γ* of the own vehicle at the present time t (current time point t), and a target curvature Cu* of the own vehicle at the present time t (current time point t). The target curvature Cu* is the curvature of the target trajectory for having the own vehicle change lanes, that is, the curvature of a curve component related to the lane change that does not include the curve curvature of the lane.

At step S16, the driving support ECU 10 reads the vehicle speed v at the present time t (current time point t) (the current vehicle speed detected by the vehicle speed sensor). Further, the driving support ECU 10 calculates the target yaw angle θy* at the present time t (current time point t), the target yaw rate γ* at the present time t (current time point t), and the target curvature Cu* at the present time t (current time point t) in accordance with Expressions (12) to (14) described below, respectively, based on the vehicle speed v, and the target lateral speed vy* and the target lateral acceleration ay* obtained at step S15.

$$\theta y^* = \sin^{-1}(vy^*/v) \qquad (12)$$

$$\gamma^* = ay^*/v \qquad (13)$$

$$Cu^* = ay^*/v^2 \qquad (14)$$

The target yaw angle θy* is calculated through applying/assigning a value obtained by dividing the target lateral speed vy* by the vehicle speed v to an arc sine function. Further, the target yaw rate γ* is calculated by dividing the target lateral acceleration ay* by the vehicle speed v. Further, the target curvature Cu* is calculated by dividing the target lateral acceleration ay* by a square value of the vehicle speed v. This functional unit/module of the driving support ECU 10 for calculating the target yaw angle θy*, the target yaw rate γ*, and the target curvature Cu* corresponds to a "target yaw state amount calculation unit" of the present invention.

Next, at steps S17, the driving support ECU 10 calculates a target control amount for the LCA. In this embodiment, the driving support ECU 10 calculates a target steering angle θlca* as the target control amount. The target steering angle θlca* is calculated in accordance with Expression (15) described below, based on (i) the target lateral position y* obtained at step S15, (ii) the target yaw angle θy*, the target yaw rate γ*, and the target curvature Cu* obtained at step S16, and (iii) the curvature Cu.

$$\theta lca^* = Klca1\cdot(Cu^*+Cu)+Klca2\cdot(\theta y^*-\theta y)+Klca3\cdot(y^*-y)+Klca4\cdot(\gamma^*-\gamma)+Klca5\cdot\Sigma(y^*-y) \quad (15)$$

In Expression (15), Klta1, Klta2, Klta3, and Klta4 are control gains. "Cu" is the curvature at the present time t (current time point t) (at the time of the calculation of θlca*), the curvature Cu being detected by the camera sensor 12. "y" is the lateral position of the own vehicle at the present time t (current time point t) (at the time of the calculation of θlca*), the lateral position y being detected by the camera sensor 12, that is, corresponds to Dy. "θy" is the yaw angle of the own vehicle at the present time t (current time point t) (at the time of the calculation of θlca*), the yaw angle θy being detected by the camera sensor 12. Further, "y" is the yaw rate of the own vehicle at the present time t (current time point t), the yaw rate γ being detected by the yaw rate sensor. The control gain Klta1 may be varied in response to the vehicle speed. A differential value of the yaw angle θy may be used as the yaw rate γ.

The first term on the right-hand side of the Expression (15) is a steering angle component which is determined in accordance with a sum of the target curvature C* and the curvature Cu (the curve curvature of the lane) and acts in a feed-forward manner. "Klca1·Cu*" is a feed-forward control amount for having the own vehicle change lanes, and "Klca1·Cu" is a feed-forward control amount for having the own vehicle travel along a curved lane with the curvature Cu. The second term on the right-hand side of the Expression (15) is a steering angle component that acts in the feed-back manner so that the deference between the target yaw angle θy* and the actual yaw angle θy is decreased. The third term on the right-hand side of the Expression (15) is a steering angle component that acts in a feed-back manner so that the difference between the target lateral position y* and the actual lateral position y is decreased. The fourth term on the right-hand side of the Expression (15) is a steering angle component that acts in a feed-back manner so that the difference between the target yaw rate γ* and the actual yaw rate γ is decreased. The fifth term on the right-hand side of the Expression (15) is a steering angle component that acts in a feed-back manner so that an integral value Σ(y*−y) of the difference between the target lateral position y* and the actual lateral position y is decreased. Therefore, the first term on the right-hand side of the Expression (15) represents the feed-forward control amount, and the second to fifth terms on the right-hand side of the Expression (15) represent the feed-back control amount(s).

The calculation method of the target steering angle θlca* is not limited to the above-mentioned method where the target steering angle θlca* is calculated by using the above-mentioned five steering angle components. The target steering angle θlca* may be calculated by using at least one steering angle component among the above-mentioned five steering angle components, or may be calculated by using any other steering angle component(s) in addition to the above-mentioned five steering angle components or in place of at least one of the above-mentioned five steering angle components. As the feed-back control amount relating to the yaw movement, either one of the "deference between the target yaw angle θy* and the actual yaw angle θy" and the "difference between the target yaw rate γ* and the actual yaw rate γ" may be used. Further, the feed-back control amount using the integral value Σ(y*−y) of the difference between the target lateral position y* and the actual lateral position y may be omitted.

After calculating the target control amount at step S17, at the next step S18, the driving support ECU 10 transmits a steering command including information on (representing) the target control amount to the EPS ECU 20. In this embodiment, the driving support ECU 10 calculates the target steering angle θlca* as the target control amount. However, the driving support ECU 10 may calculate a target torque corresponding to the target steering angle θlca* and transmit a steering command including information on (representing) the target torque to the EPS ECU 20.

When the EPS ECU 20 receives the steering command transmitted from the driving support ECU 10 via the CAN 100, the EPS ECU 20 drives (controls) the steering motor 22 in such a manner that the steering angle follows (becomes equal to) the target steering angle θlca*.

Next, at step S19, the driving support ECU 10 determines/confirms whether or not the current time point is a time point at which the own vehicle has just crossed the boundary white line WLD (broken line) which is the white line positioned to/in the side of the lane change destination and which is the boundary between the original lane and the target lane.

The camera sensor 12 outputs the lane information on each lane which has been detected ahead of (in front of) the own vehicle. When the LCA is being executed/performed, the driving support ECU 10 uses the lane information (including the lane-related vehicle information (Cu, Dy, and θy), and information on the lane width and the type of right and left white lines, etc.) on the lane center line CL of the lane in which the own vehicle is traveling (being positioned). In addition, each time the own vehicle has crossed the boundary white line WLD, the camera sensor 12 may switch the lane information on the lane in which the own vehicle is traveling from the lane information on the original lane to the lane information on the target lane. The camera sensor 12 determines whether or not the center of gravity of the own vehicle has crossed (passed across) the boundary white line WLD based on captured image data. When the camera sensor 12 determines that the center of gravity of the own vehicle has crossed the boundary white line WLD, the camera sensor 12 switches the lane-related vehicle information (Cu, Dy, and θy) from the lane-related vehicle information on the lane (i.e., original lane) in which the own vehicle traveled before crossing the boundary white line WLD to the lane-related vehicle information on the lane (i.e., target lane) into which the own vehicle has moved. Therefore, when the lane-related vehicle information is switched as described above, the sign (plus or minus) of the lateral difference Dy is reversed (changed from one to the other).

For example, it is assumed that the lateral difference Dy is a positive value when the own vehicle is positioned in the right side with respect to the lane center line CL, and that the lateral difference Dy is a negative value when the own vehicle is positioned in the left side with respect to the lane center line CL. When the own vehicle change lanes from the left lane (original lane) to the right lane (target lane), the sign of the lateral difference Dy is switched from the plus to the minus at the time point at which the own vehicle has just crossed the boundary white line WLD. In this situation, before the own vehicle has crossed the boundary white line WLD, as the own vehicle approaches the boundary white line WLD, the absolute value of the lateral difference Dy becomes larger. After the own vehicle has crossed the boundary white line WLD, as the own vehicle approaches the lane center line CL of the right lane, the absolute value of the lateral difference Dy becomes smaller.

The driving support ECU 10 reads the lateral difference Dy supplied from the camera sensor 12. When the sign of the lateral difference Dy is reversed ("the plus sign→the minus sign" or "the minus sign→the plus sign"), the driving support ECU 10 determines that the own vehicle has crossed the boundary white line WLD.

When the driving support ECU 10 does not determine that the own vehicle has crossed the boundary white line WLD (S19: No), the driving support ECU 10 proceeds the process to step S20.

At step S20, the driving support ECU 10 determines whether or not a LCA completion condition is satisfied. In this embodiment, the LCA completion condition is satisfied when the lateral position y of the own vehicle reaches the final target lateral position y*. When the LCA completion condition is not satisfied (S20: No), the driving support ECU 10 returns the process to step S15, and repeats the above-mentioned processes. Therefore, the driving support ECU 10 repeats the processes of steps S15 to S20 every time the predetermined time period elapses. Therefore, the target lateral state amount (y*, vy*, and ay*) is calculated in response to the elapsed time t, and then, the target yaw state amount (θy*, γ*, and Cu*) is calculated based on the calculated target lateral state amount (y*, vy*, and ay*). Further, the target control amount (θlca*) is calculated based on the calculated target yaw state amount (θy*, γ*, and Cu*).

Every time the driving support ECU 10 calculates/updates the target control amount (θlca*), the driving support ECU 10 transmits the steering command including the information on (representing) the target control amount (θlca*) to the EPS ECU 20. In this manner, the driving support ECU 10 can have the own vehicle travel along (according to) the target trajectory.

While the above-mentioned processes are repeated, the own vehicle gradually approaches the target lane. When the own vehicle has crossed the boundary white line WLD, the driving support ECU 10 makes a "Yes" determination at step S19. Only at the time point at which the sign of the lateral difference Dy supplied from the camera sensor 20 is reversed, the driving support ECU 10 makes a "Yes" determination at step S19. Therefore, after the driving support ECU 10 determines that the own vehicle has crossed the boundary white line WLD, the driving support ECU 10 makes a "No" determination at step S19.

When the driving support ECU 10 determines that the own vehicle has crossed the boundary white line WLD at step S19, the driving support ECU 10 proceeds the process to step S22.

At step S22, the driving support ECU 10 reinitialize the target trajectory calculation parameter. At this step S22, the driving support ECU 10 recalculates the target trajectory calculation parameter at the present time (that is, the time point at which the driving support ECU 10 determines that the own vehicle has crossed the boundary white line WLD: this is also referred to as a "boundary-crossing time point tcs"). The target trajectory calculation parameter includes the following seven parameters (P11 to P17).

P11: a set lateral position (hereinafter referred to as a "set lateral position y_cross") of the own vehicle with respect to the lane center line of the target lane at the boundary-crossing time point tcs.

P12: a set speed (hereinafter referred to as a "set lateral speed vy_cross") of the own vehicle in the lateral direction at the boundary-crossing time point tcs.

P13: a set acceleration (hereinafter referred to as a "set lateral acceleration ay_cross") of the own vehicle in the lateral direction at the boundary-crossing time point tcs.

P14: the target lateral position (final target lateral position) of the own vehicle with respect to the lane center line of the target lane at the completion of the LCA.

P15: the target speed (final target lateral speed) of the own vehicle in the lateral direction at the completion of the LCA.

P16: the target acceleration (final target lateral acceleration) of the own vehicle in the lateral direction at the completion of the LCA.

P17: the target lane change time period which is the target time period when (for) executing the LCA.

The set lateral position y_cross which is the target trajectory calculation parameter P11 is a target lateral position (target lateral position with respect to the lane center line of the target lane) at the current time point (at a time point tcs) which is estimated from the target lateral position calculated at the previous calculation step (at a time point (tcs−1)= (tcs−Δt), that is, at the calculation step immediately before it is determined that the own vehicle has crossed the boundary white line WLD. The set lateral position y_cross is calculated by the following Expression:

$$y\_cross = Dy + y(tcs-1) - Dy\_pre$$

Here, Dy is the lateral difference (=an actual lateral position, that is, the lateral difference with reference to the lane center line CL of the target lane) which is acquired from the camera sensor 12 at the current time point. Y(tcs−1) is the target lateral position calculated at the previous calculation step. Further, Dy_pre is the lateral difference which is acquired from camera sensor 12 at the previous calculation step.

The set lateral speed vy_cross which is the target trajectory calculation parameter P12 is a target lateral speed at the current time point which is estimated from the target lateral movement state amount calculated at the previous calculation step. The set lateral speed vy_cross is calculated by the following Expression:

$$vy\_cross = y'(tcs-1) + y''(tcs-1) \times \Delta t$$

Here, y'(tcs−1) is the target lateral speed calculated at the previous calculation step. y''(tcs−1) is the target lateral acceleration calculated at the previous calculation step. Δt is a calculation cycle (that is, a time period between the current calculation step and the previous calculation step).

The set lateral acceleration ay_cross which is the target trajectory calculation parameter P13 is a target lateral acceleration at the current time point which is estimated from the target lateral movement state amount calculated at the previous calculation step. The set lateral acceleration ay_cross is calculated by the following Expression:

$$ay\_cross = y''(tcs-1) + y'''(tcs-1) \times \Delta t$$

Here, $y'''(tcs-1)$ is a differential value of $y''(tcs-1)$ calculated at the previous calculation step, that is, a target lateral jerk.

The set lateral position y_cross, the set lateral speed vy_cross, and the set lateral acceleration ay_cross are collectively referred to as a "set lateral state amount at the boundary-crossing time point tcs".

The final target lateral position which is the target trajectory calculation parameter P14 is set to a position on the lane center line CL of the target lane. As described later, after it is determined that the own vehicle has crossed the boundary white line WLD, the target trajectory function represents/expresses the lateral (target) position with reference to the lane center line CL of the target lane. Therefore, the final target lateral position is set to zero. Further, both the final target lateral speed which is the target trajectory calculation parameter P15 and the final target lateral acceleration which is the target trajectory calculation parameter P16 are set to zero.

Regarding the target lane change time period which is the target trajectory calculation parameter P17, the value set at step S13 is basically used as it is. However, a remaining time period (referred to as "trest") is limited with a lower limit value. The remaining time period trest is calculated by subtracting an elapsed time period t_cross from the target lane change time period tlen, as follows. The elapsed time period t_cross is a time period from the start of the LCA to the boundary-crossing time point tcs at which it is determined that the own vehicle has crossed the boundary white line WLD.

$$trest = tlen - t\_cross$$

In parallel to the re-initialization of the target trajectory calculation parameters at step S22, the driving support ECU 10 calculates the remaining time period trest, and determines whether or not the remaining time period trest is less than the lower limit value tmin. When the remaining time period trest is equal to or greater than the lower limit value tmin, the driving support ECU 10 does not modify/correct the target lane change time period tlen. Therefore, the target lane change time period tlen set originally at step S13 is set as the target lane change time period which is the target trajectory calculation parameter P17. On the other hand, when the remaining time period trest is less than the lower limit value tmin, the driving support ECU 10 sets the target lane change time period to a value obtained by adding, to the target lane change time period tlen set originally at step S13, the shortage value (=tmin−trest) of the remaining time period trest with respect to the lower limit value tmin. For example, the lower limit value tmin is 3 seconds. When the remaining time period trest is 2 seconds, 1 second (=3−2) is added to the target lane change time period tlen set originally at step S13 so as to modify the target lane change time period tlen. Therefore, the target lane change time period tlen is increased and modified so as to ensure that the remaining time period trest is equal to or longer than the lower limit values tmin.

The driving support ECU 10 reinitializes the target trajectory calculation parameters at step S22, and then, the driving support ECU 10 recalculates the target trajectory function at step S23. Specifically, the driving support ECU 10 calculates the constants $c_0$, $c_1$, $c_2$, $c_3$, $c_4$, and $c_5$ of the target trajectory function y(t) expressed by Expression (2) based on the set lateral state amount, the final target lateral state amount, and the target lane change time period, which are set at the boundary-crossing time point tcs (that is, at step S22), and to thereby define/determine the target trajectory function y(t).

Figure 9:
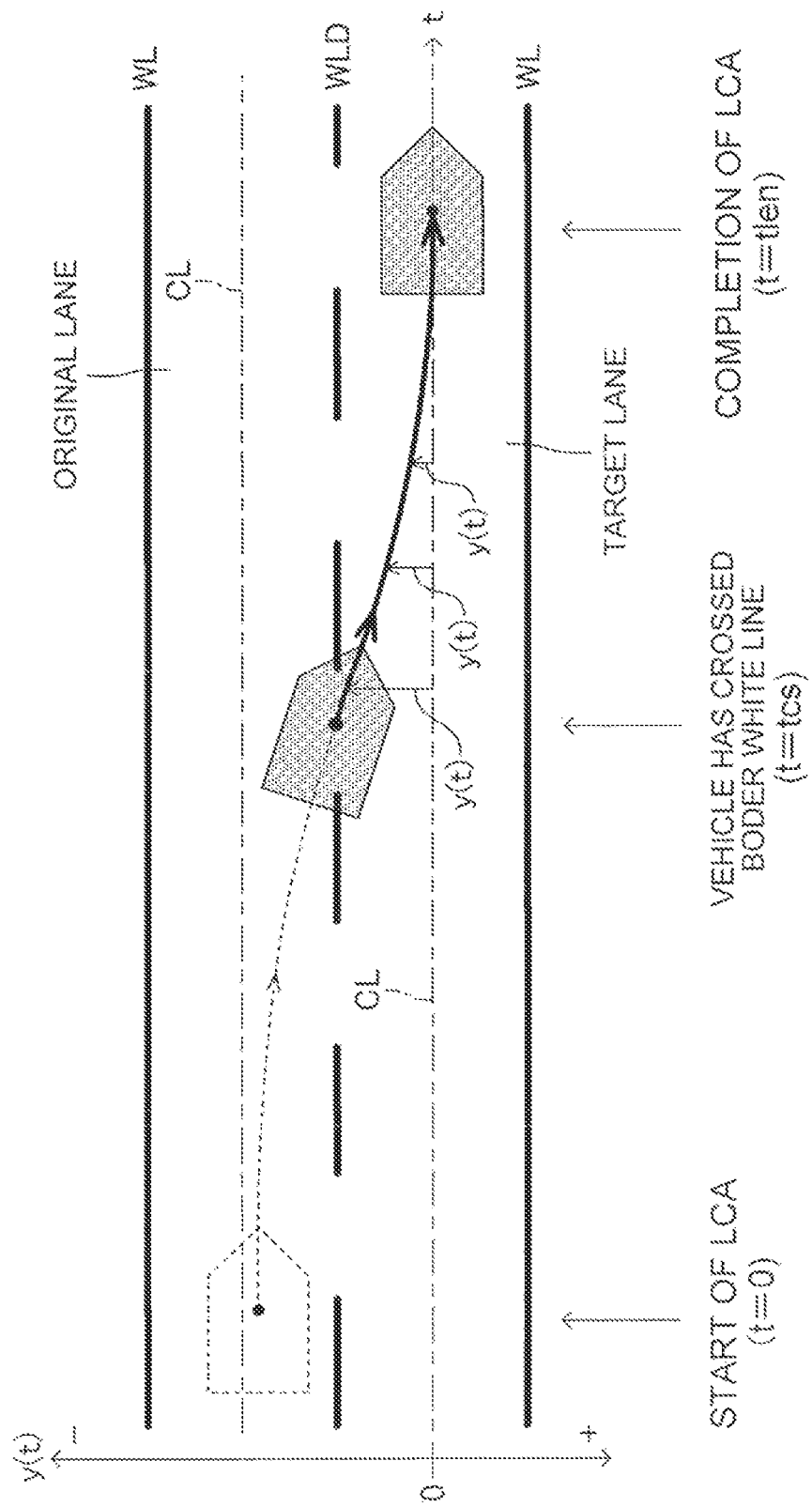
FIG. 9 is a diagram for illustrating a target trajectory function.
Figure 10:
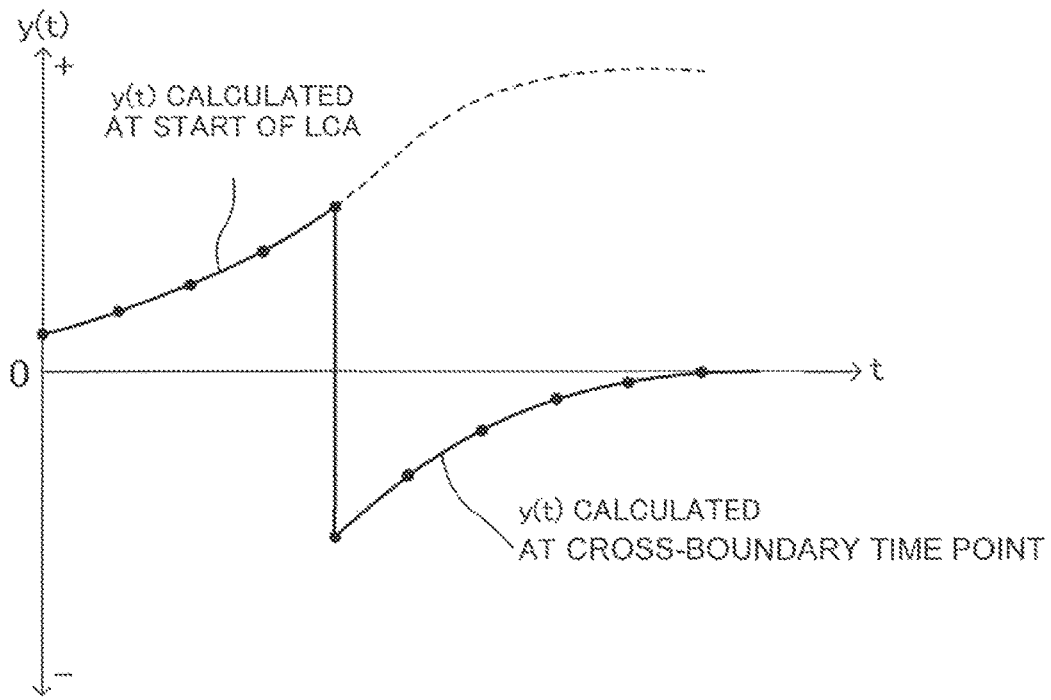
FIG. 10 is a diagram for illustrating a target trajectory function.

At the boundary-crossing time point tcs, as illustrated in FIG. 9, the origin of the lateral position is switched from the lane center line CL of the original lane to the lane center line CL of the target lane. That is, the origin (y=0) of the target trajectory function y(t) becomes the lane center line CL of the target lane. The sign (plus or minus) of the lateral position is reversed at the boundary-crossing time point tcs. Therefore, the target trajectory function y(t) from the start of the LCA to the completion of the LCA becomes the waveform as illustrated in FIG. 10.

For example, it is assumed that a time period from the start of the LCA to the boundary-crossing time point tcs is referred to as "t_cross", and the target lane change time period modified at the boundary-crossing time point tcs is referred to as "tlen". The driving support ECU 10 can calculate the constants $c_0$, $c_1$, $c_2$, $c_3$, $c_4$, and $c_5$ of the target trajectory function y(t) from the following conditions of the re-initialization of the target trajectory calculation parameter at step S22:

$$y(t\_cross) = y\_cross$$

$$y'(t\_cross) = vy\_cross$$

$$y''(t\_cross) = ay\_cross$$

$$y(tlen) = 0$$

$$y'(tlen) = 0$$

$$y''(tlen) = 0$$

Therefore, the target trajectory function y(t) can be set/determined, which smoothly varies the lateral state amount of the own vehicle from the set lateral state amount at the boundary-crossing time point tcs to the final target lateral state.

After the driving support ECU 10 has completed the recalculation of the target trajectory function y(t), the driving support ECU 10 proceeds the process to step S15, and repeats the above-mentioned processes. In this manner, the vehicle can travel along the newly generated target trajectory (that is, the recalculated target trajectory).

When the driving support ECU 10 determines that the LCA completion condition is satisfied at step S20, the driving support ECU 10 sets the steering assist control state to the LTA ON-state at step S21. That is, the driving support ECU 10 terminates/ends the LCA and resumes the LTA. Therefore, the steering assist control (LTA) starts to be performed in such a manner that the own vehicle travels along (according to) the lane center line CL of the target lane. After the driving support ECU 10 sets the steering assist control state to the LTA ON-state, the driving support ECU 10 proceeds the process to step S11, and repeats the above-mentioned processes.

Further, during a period in which the driving support ECU 10 is executing the LCA, the driving support ECU 10 continues transmitting, to the meter ECU 30, a flashing command to intermittently flash the turn signal 32 (at the side) corresponding to the operation direction of the turn signal lever 41. The turn signal 32 starts to be intermittently-flashed before the LCA is started, in response to the flashing command which starts to be transmitted from the steering ECU 40 when the turn signal lever 41 is operated to be positioned at the first stroke position P1L (P1R). Even when and after the steering ECU 40 stops transmitting the flashing command, the turn signal 32 continues intermittently-flashing in response to the flashing command transmitted from the driving support ECU 10. In this case, a time point at which intermittently-flashing of the turn signal 32 is terminated may be the same as the timepoint of the completion of the LCA or before the completion of the LCA. For example, the intermittently-flashing of the turn signal 32 may be terminated when the own vehicle reaches a lateral position which is away (in the original lane side) from the final target lateral position by a predetermined extinguishment permission distance (for example, 50 cm).

According to the above-described lane change assist apparatus, when the LCA is started, the target trajectory function is calculated/determined, and then, the steering angle is controlled in such a manner that the own vehicle travels along the target trajectory set/specified by the calculated target trajectory function (that is, the lateral state of the own vehicle matches (becomes equal to) the target lateral state in accordance with the elapsed time from the start of the LCA). At the time point at which it is determined that the own vehicle has crossed the boundary white line WLD, the target trajectory function is recalculated (determined again). Thereafter, the steering angle is controlled in such a manner that the own vehicle travels along the target trajectory set/specified by the recalculated target trajectory function. This allows the own vehicle to move to the final target position. In this manner, the lane change assist apparatus can have the own vehicle change lanes even when the driver does not perform the steering wheel operation.

Regarding the lane recognition accuracy at the start of the LCA, accuracy for recognizing the lane in which the own vehicle is traveling is better than accuracy for recognizing the adjacent lane to that lane. Therefore, in the present embodiment, the driving support ECU 10 acquires from the camera sensor 12 the lane information on the lane in which the own vehicle is traveling. When the lane information is switched to the lane information on the adjacent lane (that is, when it is determined that the own vehicle has crossed the boundary white line WLD), the driving support ECU 10 calculates/determines again the target trajectory function corresponding to the lane information on the adjacent lane (target lane). Therefore, the LCA can be executed by using the lane information with high accuracy.

For example, if the target trajectory function is calculated under the assumption that the lane width of the target lane is equal to the lane width of the original lane, there arises a problem as follows. In a case where the lane width of the target lane is different from the lane width of the original lane, if the target trajectory function at the start of the LCA is used as it is (that is, the target trajectory function at the start of the LCA continues being used) until the completion of the LCA, suitable lane change cannot be performed.

In order to solve the above-mentioned problem, in the present embodiment, the target trajectory function is recalculated at the time point at which it is determined that the own vehicle has crossed the boundary white line WLD. Therefore, even if the lane width of the target lane is different from the lane width of the original lane, suitable lane change can be performed.

Further, in the present embodiment, when executing the LCA, the driving support ECU 10 calculates the target trajectory function y(t) based on the initial lateral position, the initial lateral speed, the initial lateral acceleration, the final target lateral position, the final target lateral speed, the final target lateral acceleration, and the target lane change time period. While the LCA is being executed, the driving support ECU 10 successively (sequentially) calculates the target lateral position y*, the target lateral speed vy*, and the target lateral acceleration ay* in accordance with the elapsed time t from the start of the LCA (for each elapsed time t). Further, the driving support ECU 10 successively (sequentially) acquires the vehicle speed v at the current time point (present time) t. The driving support ECU 10 successively (sequentially) calculates the target yaw angle θy*, the target yaw rate γ*, and the target curvature Cu* which are target values relating to the movement for changing the direction of the own vehicle, based on the acquired vehicle speed v, the target lateral speed vy*, and the target lateral acceleration ay*. The driving support ECU 10 controls the steering of right and left steered wheels based on the target lateral position y*, the target yaw angle θy*, the target yaw rate γ*, and the target curvature Cu*. Therefore, the lane change assist apparatus according to the present embodiment can have the own vehicle change lanes smoothly according to the target trajectory function. Further, since the target yaw state amount is set in response to the vehicle speed, the own vehicle can be made to change lanes in a smooth manner while reflecting the accelerator pedal operation performed by the driver (i.e., the change of the vehicle speed). Furthermore, smooth lane change can be performed in cooperation with acceleration/deceleration control by the ACC.

After it is determined that the own vehicle has crossed the boundary white line WLD, the target trajectory function is calculated/determined again based on the set lateral state amount determined in consideration of the target lateral state amount at the boundary-crossing time point tcs, and the final target lateral state amount with respect to the target lane. Therefore, the own vehicle can be made to travel smoothly toward the final target position at the completion of the LCA.

For example, due to some sort of disturbance, a case may occur in which it takes a longer time until it is determined that the own vehicle has crossed the boundary white line WLD, compared to an assumed time period. In this case, the remaining time period until the completion of the LCA may be excessively short when it is determined that the own vehicle has crossed the boundary white line WLD. If this happens, the LCA cannot be performed suitably, thereafter. In view of this, in the present embodiment, the target lane change time period tlen is modified so as to ensure that the remaining time period trest is equal to or greater than the lower limit value tmin, when the target trajectory function is recalculated. Accordingly, the target trajectory function can be calculated based on a suitable target lane change time period, and therefore, the own vehicle can be made to change lanes in an appropriate manner.

Further, the target lateral speed (final target lateral speed) of the own vehicle at the completion of the LCA and the target lateral acceleration (final target lateral acceleration) of the own vehicle at the completion of the LCA are both set to zero. In addition, the target lateral position (final target lateral position) of the own vehicle at the completion of the LCA is set to the center position of the target lane in the lane width direction. Therefore, after the completion of the LCA, the driving support ECU 10 can have the own vehicle travel along (according to) the lane center line CL of the target lane with the LTA. Accordingly, the steering assist control can be smoothly switched from the LCA to the LTA.

<Modified Example of Boundary-Crossing Determination>

Figure 11:
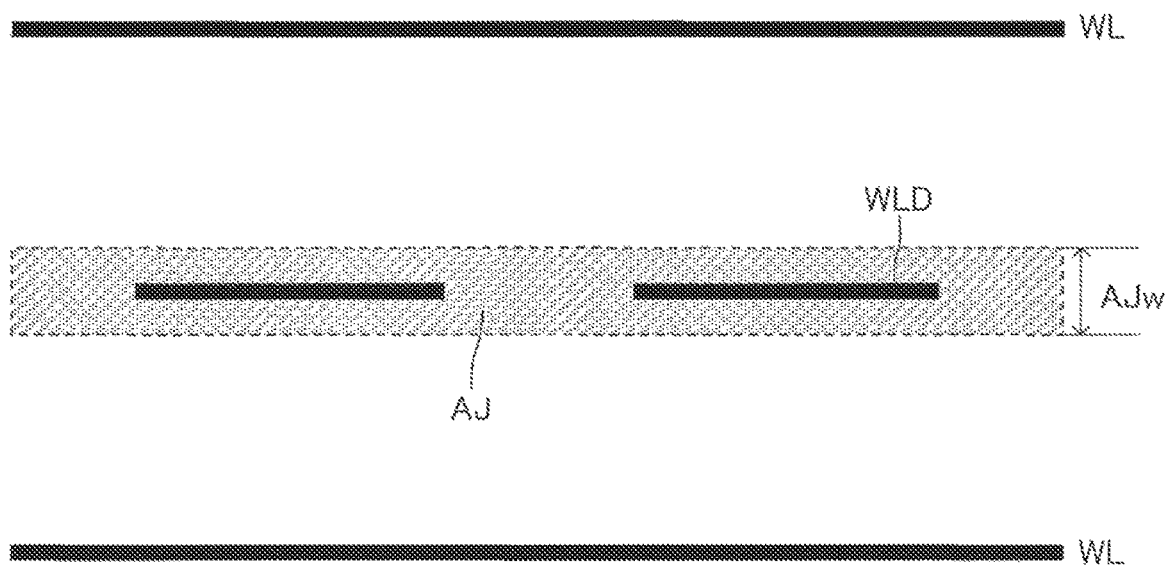
FIG. 11 is a plan view of lanes according to a modified example for determining whether the vehicle has crossed a boundary white line.

In the above-described embodiment, the determination as to whether or not the center of gravity of the own vehicle has crossed the boundary white line WLD is made. Alternatively, a determination may be made as to whether or not a predetermined specific part of the own vehicle which is different from the center of gravity has crossed the boundary white line WLD. Further, as long as it can be substantively determined that the own vehicle has crossed the boundary between the original lane and the target lane, the driving support ECU 10 may use any other determination methods for determining that the own vehicle has crossed the boundary white line WLD. For example, as illustrated in FIG. 11, a determination area AJ may be set. The determination area AJ is an area within a predetermined distance in the lane width direction from the center of the boundary white line WLD. The driving support ECU 10 may set a specific point within the determination area AJ. When the driving support ECU 10 detects that the specific part (e.g., the center of gravity) of the own vehicle has passed across the specific point, the driving support ECU 10 may determine that the own vehicle has crossed the boundary between the original lane and the target lane. The width AJw in the lane width direction of the determination area AJ may be set to any value as long as it can be substantively determined that the own vehicle has crossed the boundary between the original lane and the target lane when the specific part of the own vehicle has passed across the specific point. The width AJw may be set based on the width of the own vehicle. For example, the width AJw may be set to 1/n of the width of the own vehicle.

Further, at the start of the LCA, the driving support ECU 10 may estimate/calculate a time period between a time point at the start of the LCA and a time point at which the own vehicle is to cross the boundary white line (for example, a time period from the start of the LCA to an assumed time point at which the own vehicle is to pass across the boundary white line). When the estimated time period has elapsed from the start of the LCA, the driving support ECU 10 may determine that the own vehicle has crossed the boundary white line.

Further, in the above-described embodiment, when the center of gravity of the own vehicle has passed across (crossed) the boundary white line WLD, the lane-related vehicle information (Cu, Dy, and θy) acquired by the camera sensor 12 is switched from the lane-related vehicle information on the original lane to the lane-related vehicle information on the target lane. By means of detecting this switching, the driving support ECU 10 detects that the own vehicle has crossed the boundary white line WLD. However, it is not always necessary to determine that the own vehicle has crossed the boundary white line WLD by using the timing at which the lane-related vehicle information is switched. For example, the driving support ECU 10 may acquire from the camera sensor 12 information on a relative position of the own vehicle with respect to each of a plurality of white lines WL. Based on the information on the relative position of the own vehicle, the driving support ECU 10 may determine that the own vehicle has crossed the boundary white line WLD.

Further, if one of the above-mentioned modified examples is used, in a time period between the boundary-crossing time point tcs and the time point of the recalculation of the target trajectory function, a case may occur in which the lane in which the own vehicle is traveling (that is, the lane indicated by the lane-related vehicle information supplied from the camera sensor 12) is different from the lane as a reference of the target trajectory function y(t). In such a case, the lateral difference Dy supplied from the camera sensor 12 is transformed/modified so as to express a lateral difference from the lane center line CL of the lane, the lane center line being a reference of the target trajectory function y(t) in that period.

<Modified Example 1 for Recalculation of Target Trajectory Function>

Figure 12:
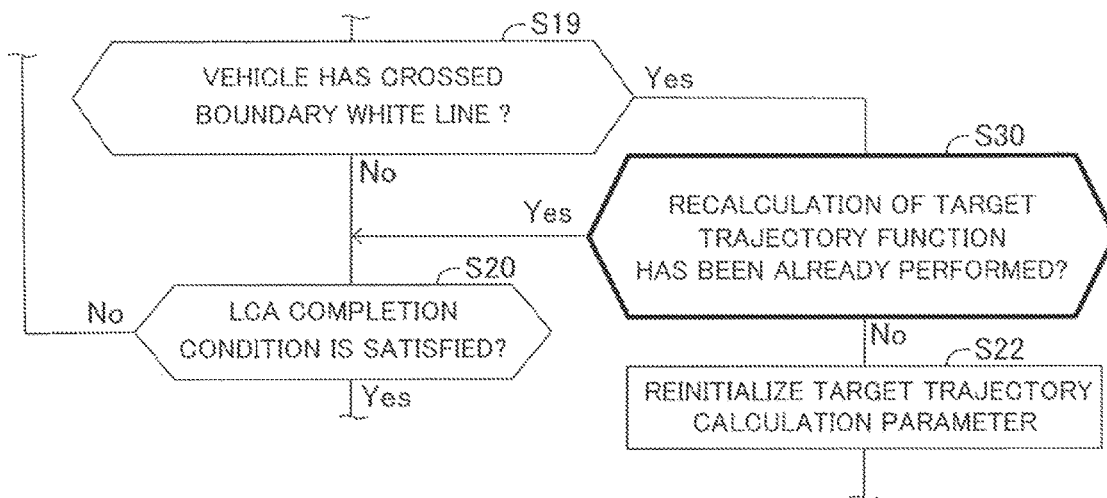
FIG. 12 is a flowchart for illustrating a steering assist control routine according to a modified example 1.

After the own vehicle has crossed the boundary white line WLD owing to the LCA, a case may occur in which the own vehicle is returned to the original lane due to a disturbance (that is, the center of gravity of the own vehicle is returned to the original lane across the boundary white line WLD). In this case, the driving support ECU 10 recalculates the target trajectory function more than once (steps S22 and S23) in the steering assist control routine (FIG. 5). For example, in a case where it is determined that the own vehicle has crossed the boundary white line WLD so that the target trajectory function has been recalculated once, the driving support ECU 10 may be configured not to recalculate the target trajectory function, thereafter. That is, the driving support ECU 10 does not proceed the process to steps S22 and S23 after the recalculation of the target trajectory function. For this modified configuration, as illustrated in FIG. 12, step S30 may be added between step S19 and step S22 in the steering assist control routine (FIG. 5) in the above-described embodiment, for example. FIG. 12 illustrates mainly a modified part in the steering assist control routine according to the modified example 1.

When the driving support ECU 10 determines that the current time point is the time point at which the own vehicle has crossed the boundary white line WLD at step S19 (S19: Yes), the driving support ECU 10 proceeds the process to step S30. At step S30, the driving support ECU 10 determines that the recalculation of the target trajectory function (the process of S23) has been already performed after the start of the LCA (which is currently being performed). When the recalculation of the target trajectory function (the process of S23) has never been performed after the start of the LCA which is currently being performed, the driving support ECU 10 makes a "No" determination at step S30, and then, proceeds the process to step S22. On the other hand, when the recalculation of the target trajectory function (the process of S23) has been already performed after the start of the LCA which is currently being performed, the driving support ECU 10 makes a "Yes" determination at step S30, and then, proceeds the process to step S20.

According to the steering assist control routine in the modified example 1, only when it is determined for the first time that the own vehicle has crossed the boundary white line WLD, the target trajectory function is recalculated. Therefore, stable LCA can be performed. In addition, the calculation load of the microcomputer of the driving support ECU 10 can be reduced.

<Modified Example 2 for Recalculation of Target Trajectory Function>

Figure 13:
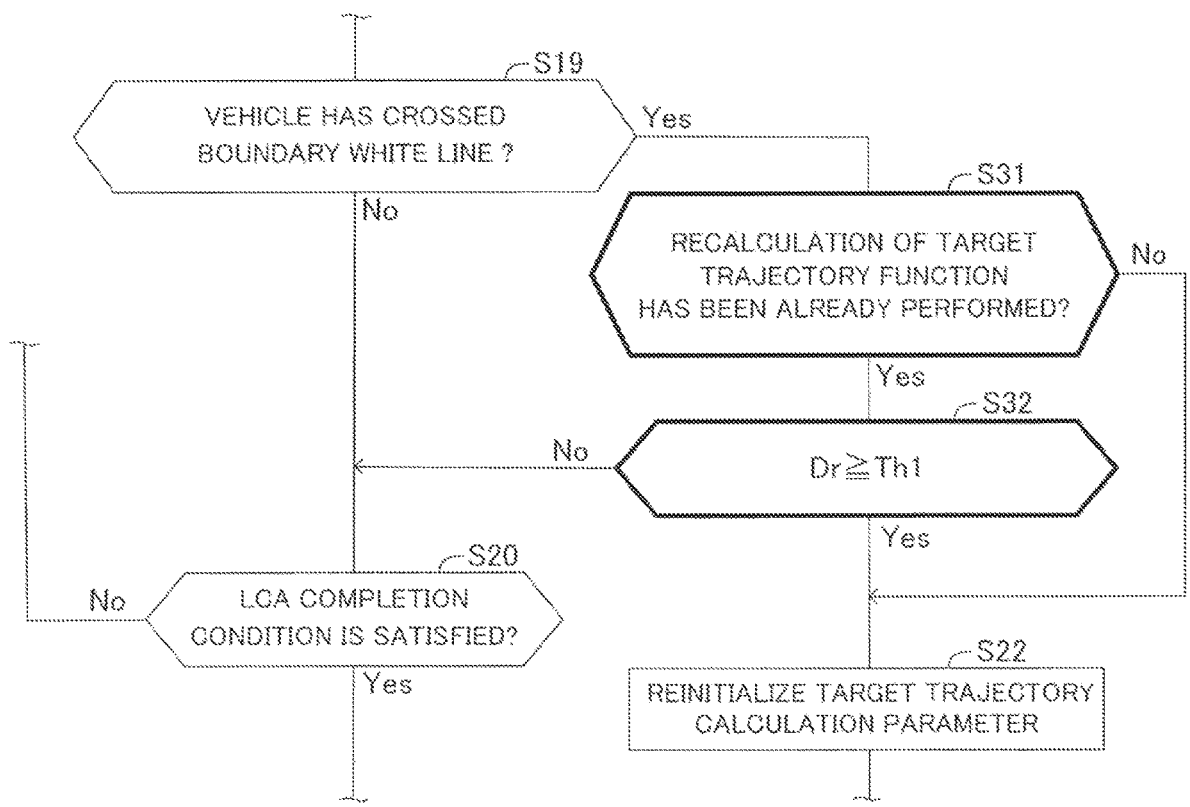
FIG. 13 is a flowchart for illustrating a steering assist control routine according to a modified example 2.

For example, for a case where the own vehicle is returned to the original lane due to a disturbance, the driving support ECU 10 may adopt hysteresis control described below, to recalculate the target trajectory function. For example, the driving support ECU 10 may obtain/calculate a movement distance in the lane width direction toward the original lane after the driving support ECU 10 determines that the own vehicle has crossed the boundary white line WLD. Thereafter, it is determined that the own vehicle has again crossed the boundary white line WLD. In this case, the driving support ECU 10 determines whether or not the obtained movement distance is equal to or longer than a predetermined distance. Then, the driving support ECU 10 recalculates the target trajectory function only when it is determined that the movement distance in the lane width direction toward the original lane is equal to or longer than the predetermined distance. For this configuration, as illustrated in FIG. 13, steps S31 and S32 may be added between step S19 and step S22 in the steering assist control routine (FIG. 5) in the above-described embodiment, for example. FIG. 13 illustrates mainly a modified part in the steering assist control routine according to the modified example 2.

When the driving support ECU 10 determines that the current time point is the time point at which the own vehicle has just crossed the boundary white line WLD at step S19 (S19: Yes), the driving support ECU 10 proceeds the process to step S31. At step S31, the driving support ECU 10 determines whether or not the recalculation of the target trajectory function (S23) has been already performed after the start of the LCA which is being performed. When the recalculation of the target trajectory function (S23) has never been performed since the start of the LCA which is being performed, the driving support ECU 10 makes a "No" determination at step S31, and then, proceeds the process directly to step S22. On the other hand, when the recalculation of the target trajectory function (the process of S23) has already been performed since the start of the LCA which is being performed, the driving support ECU 10 makes a "Yes" determination at step S31, and then, proceeds the process to step S32.

At step S32, the driving support ECU 10 determines whether or not a movement distance Dr of the own vehicle toward the original lane (that is, a reverse movement distance) from a position at which the own vehicle started moving to the original lane is equal to or longer than a predetermined distance value Th1. This distance value Th1 is a threshold for permitting the driving support ECU 10 to execute recalculation of the target trajectory function. Here, it is assumed that the driving support ECU 10 determines that the own vehicle has crossed the boundary white line WLD once (S19: Yes), and then, the own vehicle is returned from the target lane to the original lane due to a disturbance. In this case, every time a predetermined time period elapses, the driving support ECU 10 calculates the movement distance Dr toward the original lane, and stores the movement distance Dr in the RAM. At step S32, the driving support EXU 10 uses a maximum value among the movement distances Dr stored in the RAM.

At step S32, when the maximum value of the movement distances Dr stored in the RAM as above is not equal to or longer than the predetermined distance value Th1 at the time point at which the own vehicle has again crossed the boundary white line WLD, the driving support ECU 10 makes a "No" determination, and then, proceeds the process to step S20. Therefore, the target trajectory function is not recalculated. On the other hand, when the maximum value of the movement distances is equal to or longer than the predetermined distance value Th1 at the time point at which the own vehicle has again crossed the boundary white line WLD, the driving support ECU 10 makes a "Yes" determination, and then, proceeds the process to step S22. Therefore, the target trajectory function is recalculated again.

According to the steering assist control routine (FIG. 13) in the modified example 2, only when the own vehicle is returned to the original lane with a large distance, the recalculation of the target trajectory function is once again executed. Therefore, even if the behavior of the own vehicle is disturbed due to a large disturbance, the own vehicle cam be made to change lanes in a suitable manner.

In the above modified examples 1 and 2, while the own vehicle is being positioned in the original lane after the own vehicle is returned to the original lane, the lateral position Dy of the original lane supplied from camera sensor 12 may be converted into a value corresponding to the lateral position of the target lane (that is, a value with reference to the lane center line CL of the target lane as the origin).

<Modified Example of Lateral State Amount at Boundary-Crossing Time Point>

In the above-described embodiment, the "set lateral position y_cross at the boundary-crossing time point tcs which is the target trajectory calculation parameter P11" is set to the target lateral position at the current time point which is estimated from the target lateral position calculated at the previous calculation step. In place of this configuration, the set lateral position y_cross may be set to an actual lateral position. This actual lateral position is an actual detection value of the lateral position at the time point at which it is determined that the own vehicle has crossed the boundary white line WLD. Further, the set lateral position y_cross may be set to a value determined based on both the target lateral position and the actual lateral position, such as by obtaining a weighted average value between the target lateral position and the actual lateral position using a predetermined weighting ratio.

In the above-described embodiment, the "set lateral speed vy_cross at the boundary-crossing time point tcs which is the target trajectory calculation parameter P12" is set to the target lateral speed at the current time point which is estimated from the target lateral movement state amount calculated at the previous calculation step. In place of this configuration, the set lateral speed vy_cross may be set to an actual lateral speed. This actual lateral speed is an actual detection value of the lateral speed at the time point at which it is determined that the own vehicle has crossed the boundary white line WLD. Further, the set lateral speed vy_cross may be set to a value determined based on both the target lateral speed and the actual lateral speed, such as by obtaining a weighted average value between the target lateral speed and the actual lateral speed using a predetermined weighting ratio.

In the above-described embodiment, the "set lateral acceleration ay_cross at the boundary-crossing time point tcs which is the target trajectory calculation parameter P13" is set to the target lateral acceleration at the current time point which is estimated from the target lateral movement state amount calculated at the previous calculation step. In place of this configuration, the set lateral acceleration ay_cross may be set to an actual lateral acceleration. This actual lateral acceleration is an actual detection value at the time point at which it is determined that the own vehicle has crossed the boundary white line WLD. Further, the set lateral acceleration ay_cross may be set to a value determined based on both the target lateral acceleration and the actual lateral acceleration at the boundary-crossing time point tcs, such as by using a predetermined weighting ratio to obtain a weighted average value of the target lateral acceleration and the actual lateral acceleration.

In the above, the lane change assist apparatus according to the embodiment has been described, but the present invention is not limited to the above-mentioned embodiment, and various changes are possible within the range not departing from the object of the present invention.

In the above-described embodiment, a fifth-order function is used as the target trajectory function. However, it is not always necessary to use a fifth-order function. In the above-described embodiment, the target lateral speed and the target lateral acceleration are calculated to be used as the target lateral movement state amount. However, only the target lateral speed or only the target lateral acceleration may be calculated to be used as the target lateral movement state amount. In the above-described embodiment, the target yaw angle, the target yaw rate, and the target curvature are calculated to be used as the target yaw state amount. However, at least one of them may be calculated to be used as the target yaw state amount.

For example, in the above embodiment, it is a prerequisite for carrying out the LCA that the steering assist control state is in the LTA ON-state (that is, the LTA is being executed). In other words, the LCA does not start to be executed unless the steering assist control state is in the LTA ON-state. However, such a prerequisite is not necessarily required to start the LCA. Further, as a prerequisite for carrying out the LCA, there is no need to assume that the ACC is being executed. In other words, the LCA may be able to be started even if the steering assist control state is not in the LTA ON-state. In the above embodiment, the LCA start condition includes the following condition: the road on which the own vehicle is traveling is a road for exclusive use of automobiles. However, the LCA start condition does not necessarily include such a condition.

What is claimed is:

1. A lane change assist apparatus for a vehicle, the lane change assist apparatus comprising:
    a camera configured to capture images ahead of the vehicle;
    a processor configured to:
        recognize an original lane in which the vehicle currently travels based on at least one of the captured images;
        detect a relative positional relationship of the vehicle with respect to the recognized original lane;
        obtain, based on the relative positional relationship of the vehicle with respect to the recognized original lane, a target trajectory along which the vehicle is to travel to change lanes from the original lane to a target lane adjacent to the original lane in a lane change direction, wherein the target trajectory is obtained based on:
            (i) an initial lateral state amount representing a lateral position of the vehicle with respect to the original lane at a start of a lane change assist control and a lateral movement state amount which is a movement state of the vehicle in a road width direction at the start of the lane change assist control; and
            (ii) a final target lateral state amount representing a target lateral position of the vehicle with respect to the original lane at a completion of the lane change assist control and a target lateral movement state amount of the vehicle at the completion of the lane change assist control; and
        control a steering of a steered wheel in such a manner that the vehicle travels along the target trajectory,
    wherein the processor is further configured to:
    set a target lane change time period which is a target time period from the start of the lane change assist control until the completion of the lane change assist control; and
    obtain the initial lateral state amount and the final target lateral state amount based on:
        (i) a lateral position of the vehicle with respect to a lane center line of the original lane at the start of the lane change assist control;
        (ii) a speed of the vehicle in a lateral direction at the start of the lane change assist control;
        (iii) an acceleration of the vehicle in the lateral direction at the start of the lane change assist control;
        (iv) a target lateral position of the vehicle with respect to the lane center line of the original lane at the completion of the lane change assist control;
        (v) a target speed of the vehicle in the lateral direction at the completion of the lane change assist control;
        (vi) a target acceleration of the vehicle in the lateral direction at the completion of the lane change assist control; and
        (vii) the target lane change time period.

2. The lane change assist apparatus according to claim 1, wherein the processor is further configured to:
    determine whether the vehicle has crossed a boundary between the original lane and the target lane; and
    based on determining that the vehicle has crossed the boundary between the original lane and the target lane:
    reobtain the initial lateral state amount and the final target lateral state amount at a boundary-crossing time point.

3. The lane change assist apparatus according to claim 1, wherein the processor is further configured to:
    when the lateral position of the vehicle at the start of the lane change assist control is shifted toward the target lane with respect to the lane center line of the original lane, decrease the target lane change time period as a shift amount is increased; and
    when the lateral position of the vehicle at the start of the lane change assist control is shifted to a side opposite to the target lane with respect to the lane center line of the original lane, increase the target lane change time period as the shift amount is increased.

* * * * *